US008160425B2

(12) United States Patent
Kisliakov

(10) Patent No.: US 8,160,425 B2
(45) Date of Patent: Apr. 17, 2012

(54) STORING VIDEO DATA IN A VIDEO FILE

(75) Inventor: Andrew Kisliakov, Burwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 988 days.

(21) Appl. No.: 11/994,265

(22) PCT Filed: Jun. 28, 2006

(86) PCT No.: PCT/AU2006/000913
§ 371 (c)(1),
(2), (4) Date: Jun. 3, 2008

(87) PCT Pub. No.: WO2007/000029
PCT Pub. Date: Jan. 4, 2007

(65) Prior Publication Data
US 2009/0220206 A1    Sep. 3, 2009

(30) Foreign Application Priority Data

Jun. 29, 2005    (AU) ................. 2005202866

(51) Int. Cl.
*H04N 5/93* (2006.01)
*H04N 5/76* (2006.01)
(52) U.S. Cl. .................... 386/278; 348/341
(58) Field of Classification Search ............ 386/223, 386/224, 235, 278, 281, 341
See application file for complete search history.

(56) References Cited

U.S. PATENT DOCUMENTS

| 5,856,830 | A | 1/1999 | Yamamoto | 345/474 |
|---|---|---|---|---|
| 6,675,386 | B1 | 1/2004 | Hendricks et al. | 725/105 |
| 6,694,087 | B1 | 2/2004 | Weaver | 386/52 |
| 6,741,977 | B1 | 5/2004 | Nagaya et al. | 707/1 |
| 6,744,968 | B1 | 6/2004 | Imai et al. | 386/52 |
| 6,877,134 | B1 | 4/2005 | Fuller et al. | 715/500.1 |
| 6,892,353 | B1 | 5/2005 | Ubillos | 715/727 |
| 2003/0172116 | A1 | 9/2003 | Curry et al. | 709/206 |
| 2003/0197785 | A1 | 10/2003 | White et al. | 348/207.99 |
| 2004/0032525 | A1* | 2/2004 | Aharon | 348/350 |
| 2004/0052501 | A1 | 3/2004 | Tam | 386/46 |
| 2004/0080615 | A1 | 4/2004 | Klein et al. | 348/143 |

(Continued)

FOREIGN PATENT DOCUMENTS

EP    920015    6/1999

(Continued)

OTHER PUBLICATIONS

Australian Examiner's Report dated Sep. 23, 2010 in corresponding Australian Application No. 2006264221.

(Continued)

*Primary Examiner* — Robert Chevalier
(74) *Attorney, Agent, or Firm* — Fitzpatrick, Cella, Harper & Scinto

(57) ABSTRACT

A method of storing different video data in a video file is disclosed. The method processes a display of video windows (eg 621) each for displaying the different video data in an arrangement, and a user interface (eg 601) for selecting a period of the different video data to be stored for display in the video windows (eg 621) The method stores a portion of the different video data, corresponding to the selected period, in the video file. The video file maintains the arrangement of the video windows (eg 621) for displaying the portion of video data.

9 Claims, 18 Drawing Sheets

U.S. PATENT DOCUMENTS

| | | |
|---|---|---|
| 2004/0221311 A1 | 11/2004 | Dow et al. ..................... 725/52 |
| 2004/0231001 A1 | 11/2004 | Kisliakov |
| 2005/0132414 A1 | 6/2005 | Bentley et al. ................ 725/105 |

FOREIGN PATENT DOCUMENTS

| | | |
|---|---|---|
| EP | 1376583 | 1/2004 |
| GB | 2341969 A | 3/2000 |
| JP | 5-81406 | 4/1993 |
| JP | 2003-169297 | 6/2003 |
| JP | 2004-173083 | 6/2004 |
| WO | 02/102080 | 12/2002 |

OTHER PUBLICATIONS

Communication pursuant to Article 94(3) EPC dated Mar. 9, 2011 in corresponding European Application No. 06741289.0.

Notice of Acceptance dated Dec. 16, 2010 in corresponding Australian Application No. 2006264221.

* cited by examiner

STORING VIDEO DATA IN A VIDEO FILE

FIELD OF THE INVENTION

The present invention relates generally to digital video recording and, in particular, to a method and apparatus for storing video data in a video file. The present invention also relates to a computer program product including a computer readable medium having recorded thereon a computer program for storing video data in a video file.

BACKGROUND

There are many existing systems that perform networked digital video recording. These systems are often comprised of readily available components. Such components often include a TCP/IP network, one or more digital video cameras and one or more storage servers. Storage servers are computer systems running software that receives video data from the video cameras and stores the video data on a storage medium such as a hard disk drive. Some digital video recording systems also use viewing application software resident on remote computers. This viewing application software may be used for viewing live or pre-recorded video data received from either the video cameras or the storage servers. The live or pre-recorded video data may be viewed in one or more viewing windows generated by the viewing application software and rendered on a computer display. The viewing application software typically provides the ability to extract pre-recorded video data from a given camera for storage in a video file. The video file may then be played back using any suitable media player, such as the Apple QuickTime™ media player.

Video files are useful since they may be used to maintain a record of significant events following the deletion of video data stored on the storage server to make way for new video data. Additionally, video files may be sent to other parties who either do not have viewing application software installed, or do not have sufficient privileges to access a storage server. For example, video data extracted and stored in a video file (e.g., a QuickTime™ file) in order to submit evidence of a crime to law enforcement agencies.

Additionally, some viewing application software provides the ability to view synchronised pre-recorded video data from multiple networked cameras. In one known digital video recording system, viewing application software generates a timeline showing the exact time of the video data currently being played. Clicking on the timeline allows the time of video data currently being played to be changed. The timeline also contains information about events that occurred concurrently to the video data currently being played. These events are displayed as vertical bars. Hovering the mouse over one of these vertical bars causes additional information about the event (in the form of a 'tooltip') to be displayed near the vertical bar.

The digital video recording systems described above suffer from the disadvantage that extracted video data (e.g., video data extracted and stored in a video file) loses information which would otherwise have been available to a user running viewing application software used to extract the video data.

Thus, a need clearly exists for a more efficient method of storing video data in a video file.

SUMMARY

It is an object of the present invention to substantially overcome, or at least ameliorate, one or more disadvantages of existing arrangements.

According to one aspect of the present invention there is provided a method of storing different video data in a video file, comprising the steps of:

processing a display of video windows each for displaying said different video data in an arrangement, and a user interface for selecting a period of said different video data to be stored for display in said video windows; and storing a portion of said different video data corresponding to said selected period, in said video file, wherein said video file maintains the arrangement of said video windows for displaying said portion of video data.

According to another aspect of the present invention there is provided a video file comprising:

a plurality of video tracks each storing frames of video data captured within a selected period, each of said video tracks indicating relative positions of corresponding video windows used for displaying the corresponding frames of video data; and an animation track comprising data representing said video windows and a user interface corresponding to said selected period, wherein said animation track comprises further data for generating animations providing said user interface with user interactive features.

According to still another aspect of the present invention there is provided an apparatus for storing different video data in a video file, comprising:

an interface for displaying video windows each for displaying said different video data in an arrangement, and for displaying a user interface for selecting a period of said different video data to be stored for display in said video windows; and a processor for storing a portion of video data, corresponding to a selected period, in said video file, wherein said video file maintains the arrangement of said video windows for displaying said portion of video data.

According to still another aspect of the present invention there is provided an apparatus for storing different video data in a video file, comprising:

display means for displaying video windows each for displaying said different video data in an arrangement, and for displaying a user interface for selecting a period of said different video data to be stored for display in said video windows; and storage means for storing a portion of said different video data, corresponding to a selected period, in said video file, wherein said video file maintains the arrangement of said video windows for displaying said portion of said different video data.

According to still another aspect of the present invention there is provided a computer readable program for storing different video data in a video file, said program comprising:

code for processing a display of video windows each for displaying said different video data in an arrangement, and a user interface for selecting a period of said different video data to be stored for display in said video windows; and code for storing a portion of said different video data, corresponding to a selected period, in said video file, wherein said video file maintains the arrangement of said video windows for displaying of said portion of said different video data.

Other aspects of the invention are also disclosed.

BRIEF DESCRIPTION OF THE DRAWINGS

Some aspects of the prior art and one or more embodiments of the present invention will now be described with reference to the drawings and appendices, in which:"

DETAILED DESCRIPTION INCLUDING BEST MODE

Figure 1:
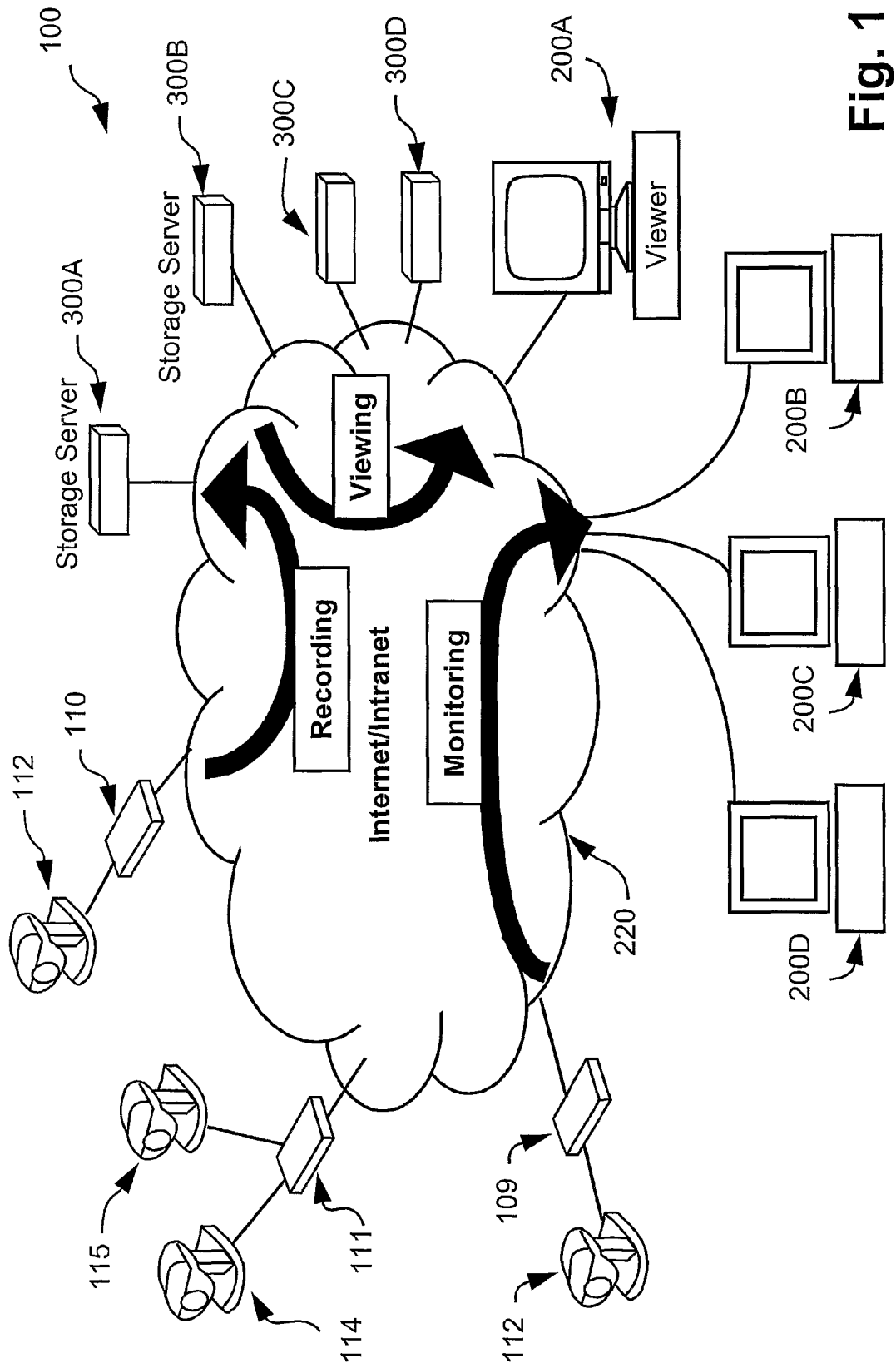
FIG. 1 is schematic diagram of a digital video recording system upon which embodiments described may be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices, which form public knowledge through their respective publication and/or use. Such should not be interpreted as a representation by the present inventor(s) or patent applicant that such documents or devices in any way form part of the common general knowledge in the relevant art.

For ease of explanation the following description has been divided into Sections 1.0 to 5.0, each section including associated sub-sections.

1.0 Digital Video Data Recording System Overview

As described above, conventional digital video recording systems suffer from the disadvantage that video data extracted and stored in a video file loses information which would otherwise have been available to a user running viewing application software used to extract the video data. This problem may be overcome by rendering all video windows and data associated with a timeline into a single video track, which may be played back. However, the interactivity of the timeline would then be lost. Another potential solution is to generate an executable file that contains code to render video data as well as code to provide interactive features of the timeline. However, the executable file is then restricted to one computing platform and sharing of the video file is inhibited due to possible suspicion of virus infection.

A method 700 (see FIG. 7) of storing video data in a video file is described below with reference to FIGS. 1 to 19. In one embodiment, the method 700 may be implemented within a digital video recording system 100, such as that shown in FIG. 1.

The digital video recording system 100 comprises video cameras 112, 113, 114 and 115 connected to a computer network 220, such as the Internet or an Intranet, via an associated camera server 109, 110 and 111. The network 220 may be a local area network (LAN). Accordingly, the network 220 may be referred to as a digital network. One or more of the cameras 112-115 may be configured within an associated camera server 109-111, such that the camera and camera server is a single unit.

Some examples of proprietary cameras 112-115 are the Canon™ VC-C4 video camera. Further, proprietary camera servers 109-111 include the Canon™ VB150 and the Canon™ VB-C10 where the VB-C10 is an example of a model where the camera and camera server is a single unit.

Each of the cameras 112, 113, 114 and 115 and the associated camera servers 109-111 are responsible for the capture of video data representing images. The video data is output by the camera servers 109-111 as a stream of video data. The camera servers 109-111 optionally comprise sensor inputs to which sensors may be connected. If a sensor connected to a camera server 109-111 is activated, then the camera server 109-111 may be configured to generate an event notification.

The system 100 also comprises storage servers 300A, 300B, 300C and 300D, which may be used for monitoring the output of video data from any one of the camera servers 109-111 and for recording (i.e., requesting and storing) the video data. The storage servers 300A, 300B, 300C and 300D may also be used for accessing video data, for event handling and for control of the system 100. The storage servers 300A to 300D will hereinafter be generically referred to as the storage server 300, excepting where explicitly distinguished.

The video data captured by one or more of the cameras 112-115 and associated camera servers 109-111 may be uploaded, via the computer network 220, from any one of the camera servers 109-111 to the storage server 300. The video data may be processed by the storage server 300 and/or stored on a hard disk drive 310 of the storage server (see FIG. 3), so that the video data may be viewed by a user using a display 314 (see FIG. 3) of the storage server 300.

Alternatively, the video data may be exported, via the computer network 220 (i.e., the digital network), from the storage server 300 to one or more viewers 200A, 200B, 200C and 200D, as seen in FIG. 1. The viewers 200A to 200D will hereinafter be generically referred to as the viewer 200, excepting where explicitly distinguished.

The viewer 200 may be used for processing and displaying one or more frames of the exported video data. The viewer 200 may be configured to receive video data directly from one or more camera servers 109-111 and to present the video data to a user using the display device 214.

Figure 2:
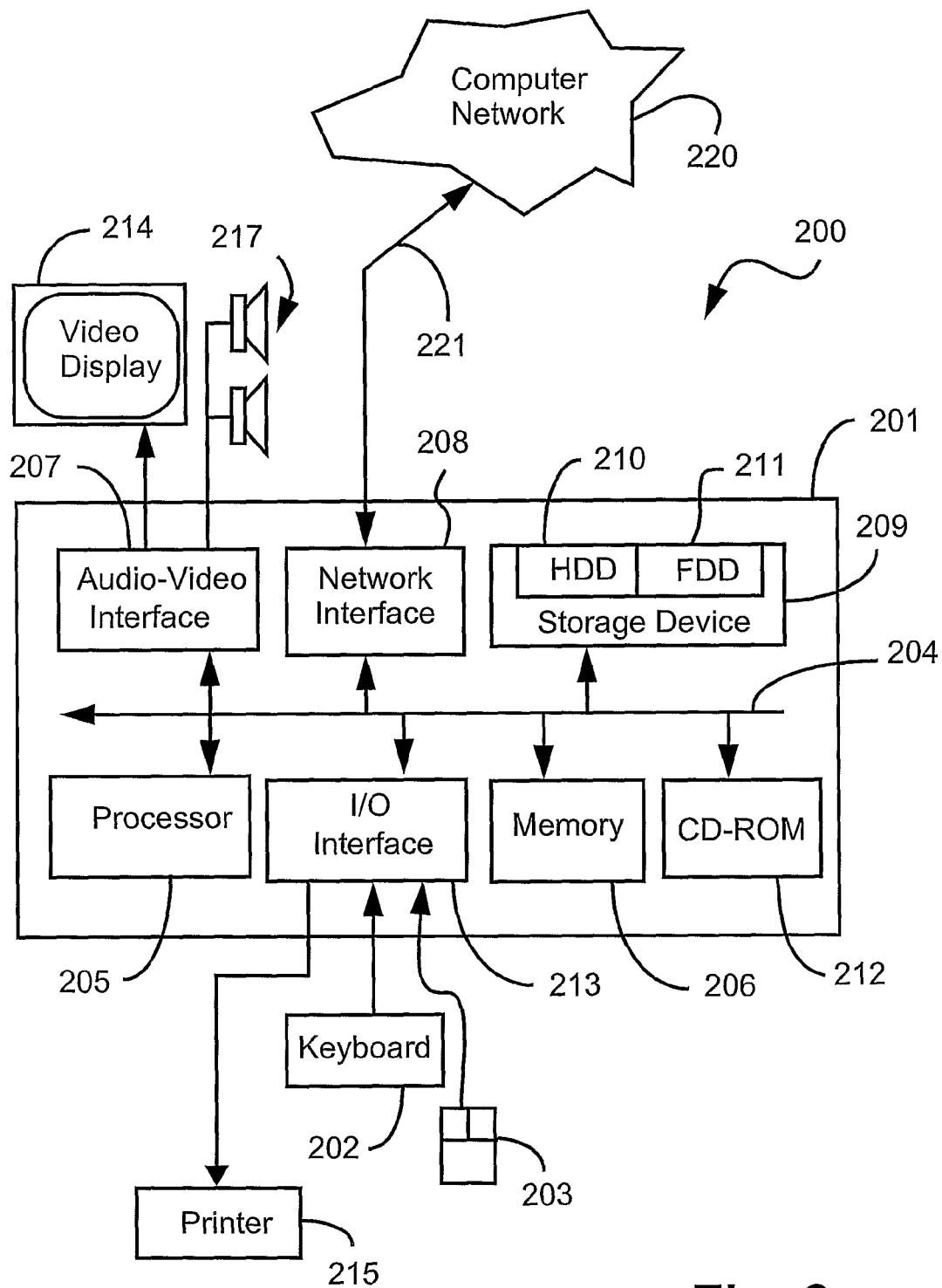
FIG. 2 is a schematic block diagram of a general-purpose computer upon which a viewer described herein may be practiced.

As seen in FIG. 2, the viewer 200 is preferably formed by a computer module 201, input devices such as a keyboard 202 and mouse 203, output devices including a printer 215, a display device 214 and loudspeakers 217. A network interface 208 configured within the computer module 201 may be used for communicating to and from the computer network 220, for example connectable via a network link 221 (such as a coaxial cable, a twisted pair cable, a fibre optic cable, a wireless connection using 802.11b or Bluetooth™ or other connection type). A Modulator-Demodulator (Modem) transceiver device (not shown) incorporated within the network interface 208 or otherwise, may also be used to obtain access to the computer network 220, via a telephone line for example.

The computer module 201 typically includes at least one processor unit 205, and a memory unit 206, for example, formed from semiconductor random access memory (RAM) and read only memory (ROM). The module 201 also includes a number of input/output (I/O) interfaces including an audio-video interface 207 that couples to the video display 214 and loudspeakers 217, an I/O interface 213 for the keyboard 202 mouse 203, printer 215 and optionally a joystick (not illustrated) or trackball (not illustrated). Optionally the module 201 may include a touch-screen (not shown) formed by an overlaid touch-sensitive surface on the video display 214, allowing user input by touching or moving a finger along the video display 214. A storage device 209 is provided and typically includes a hard disk drive 210 and a floppy disk drive 211. A magnetic tape drive (not illustrated) may also be used. A CD-ROM drive 212 is typically provided as a non-volatile source of data. The components 205 to 213 of the computer module 201, typically communicate via an interconnected bus 204 and in a manner, which results in a conventional mode of operation of a computer system as known to those in the relevant art. Examples of computers on which the described arrangements may be practiced include IBM-PC's and compatibles, Sun Sparcstations or alike computer systems evolved therefrom.

Figure 3:
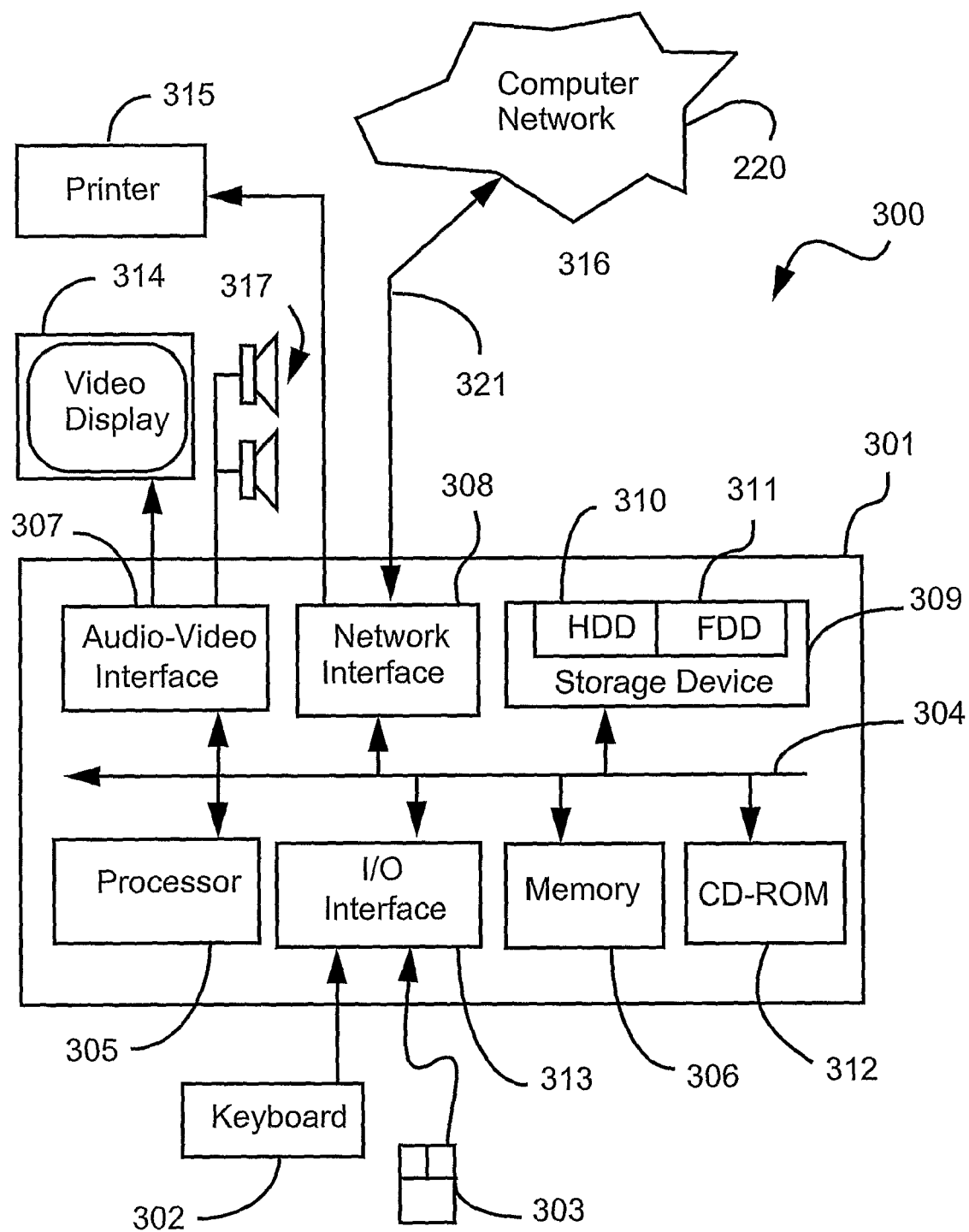
FIG. 3 is a schematic block diagram of a general-purpose computer upon which a storage server described herein may be practiced.

The storage server 300 is also shown in detail in FIG. 3. The storage server 300 is preferably formed by a computer module 301, input devices such as a keyboard 302 and mouse 303, output devices including a printer 315, a display device 314 and loudspeakers 2317. A network interface 308 is also configured within the computer module 301 and may be used for communicating to and from the computer network 220, for example connectable via network link 321 (such as a coaxial cable, a twisted pair cable, a fibre optic cable, a wireless connection using 802.11b or Bluetooth™ or other connection type). A Modulator-Demodulator (Modem) transceiver device (not shown) incorporated within the network interface 308 or otherwise, may also be used to obtain access to the computer network 220, via a telephone line for example.

Similar to the computer module 201, the computer module 301 typically includes at least one processor unit 305, and a memory unit 306, for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 313 for the keyboard 302, printer 315 and mouse 303 and optionally a joystick (not illustrated) or trackball (not illustrated). Optionally the module 301 may include a touch-screen (not shown) formed by an overlaid touch-sensitive surface on the video display 314, allowing user input by touching or moving a finger along the video display 314. A storage device 309 is provided and typically includes a hard disk drive 310 and a floppy disk drive 311. A magnetic tape drive (not illustrated) may also be used. Peripheral storage devices (not shown) connected to the computer module 301 may be used. In addition, network accessible storage devices or collections of such devices (not shown), including Network Attached Storage (NAS) and Storage Area Networks (SAN), may be connected to the network 220 and may be accessed through the network interface 308. A CD-ROM drive 312 is typically provided as a non-volatile source of data. The components 305 to 313 of the computer module 301, typically communicate via an interconnected bus 304 and in a manner, which results in a conventional mode of operation of such a computer system as known to those in the relevant art.

The camera servers 109-111 have a similar configuration to the computer modules 201 and 301. The camera servers 109-111 include a memory (e.g., memory 306) and a processor (e.g., a processor 305). However, the hardware configuration of the camera servers 109-111 will not be explained in further detail herein.

As described above, the storage server 300 may be used for monitoring and handling events from sensors (e.g., sensors attached to the camera servers 109-111). One of these events may include motion detection using a motion detector (not shown) connected to one or more of the camera servers 109-111 directly. Further events include heat/smoke detection using a heat/smoke detector, a door opening/closing using a limit switch, for example.

2.0 Storage Server

The storage server 300 comprises a recording component and an access component. The recording component and the access component may be implemented as separate software applications resident on the hard disk drive 310 and being controlled in their execution by the processor 305. Alternatively, the recording component and access component may be implemented as a single software application. Further, one or both of the recording and component may be implemented in hardware.

2.1 Recording Component

The recording component may be used to retrieve live video data from one or more of the camera servers 109-111 and store the video data in the hard disk drive 310. The video data may be stored in a time-indexed form so that the video data may be later retrieved given a reference to the time that the video data was captured. Video data may be stored in a Motion JPEG format within a series of video files (e.g., QuickTime™ files). Each of the video files includes a file name containing start and end times for the video data stored in the file.

Additionally, the recording component records events, which may be generated from motion detected within the video data or from sensors (e.g., sensors attached to the camera servers 109-111). Other types of events are also available as described above. Event data may be stored in text files where each event is described in an event record in such a text file. An event record may contain the time, priority and description of the event. The priority is typically a value between one (1) and five (5), where one (1) indicates an important event and five (5) indicates an unimportant event.

2.2 Access Component

The access component provides access to video and event data stored by the recording component. The access component monitors what video and event files are available on the hard disk drive 310 for each camera 112-115, and which time periods are covered by the available files.

Figure 4:
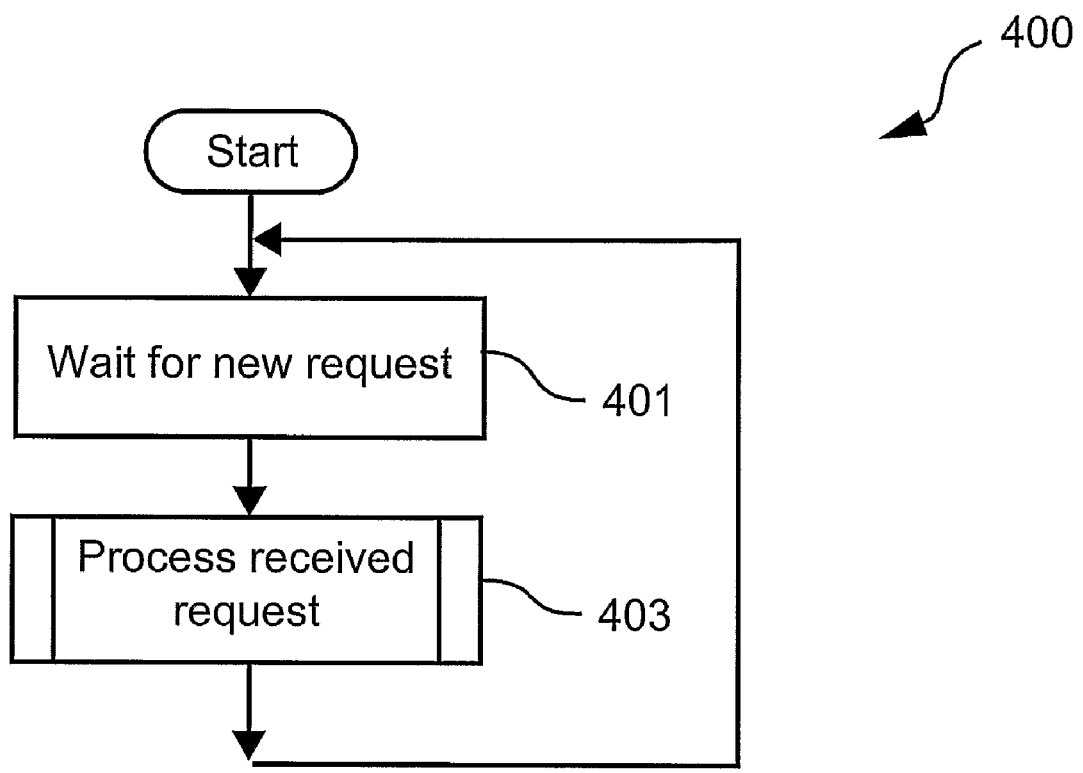
FIG. 4 is a flow diagram showing a method of accessing video or event data.

The access component executes a continuous loop to listen for remote requests from the viewer 200 for video or event data, in accordance with a method 400 of accessing video or event data, which will now be described below with reference to FIG. 4. Each request generated by the viewer contains a flag indicating whether the request is a request for video or event data. Each request also contains two values indicating start and end times of the period of time for which video or event data is requested.

The method 400 may be implemented as software resident on the hard disk drive 310 of the storage server 300 and being controlled in its execution by the processor 305. The method 400 begins at step 401, where the processor 305 waits to detect a new request from the viewer 200. Requests are typically received from the viewer 200 over the communications network 220 (e.g., using HTTP protocol over a TCP/IP connection). At the next step 403, the processor 305 creates a new thread and executes a method 500 of processing a request (see FIG. 5) in the newly created thread. The method 500 executed at step 403 will be described in detail below with reference to FIG. 5. Following step 403 the method 400 returns to step 401 and the processor 305 waits for a new request.

Figure 5:
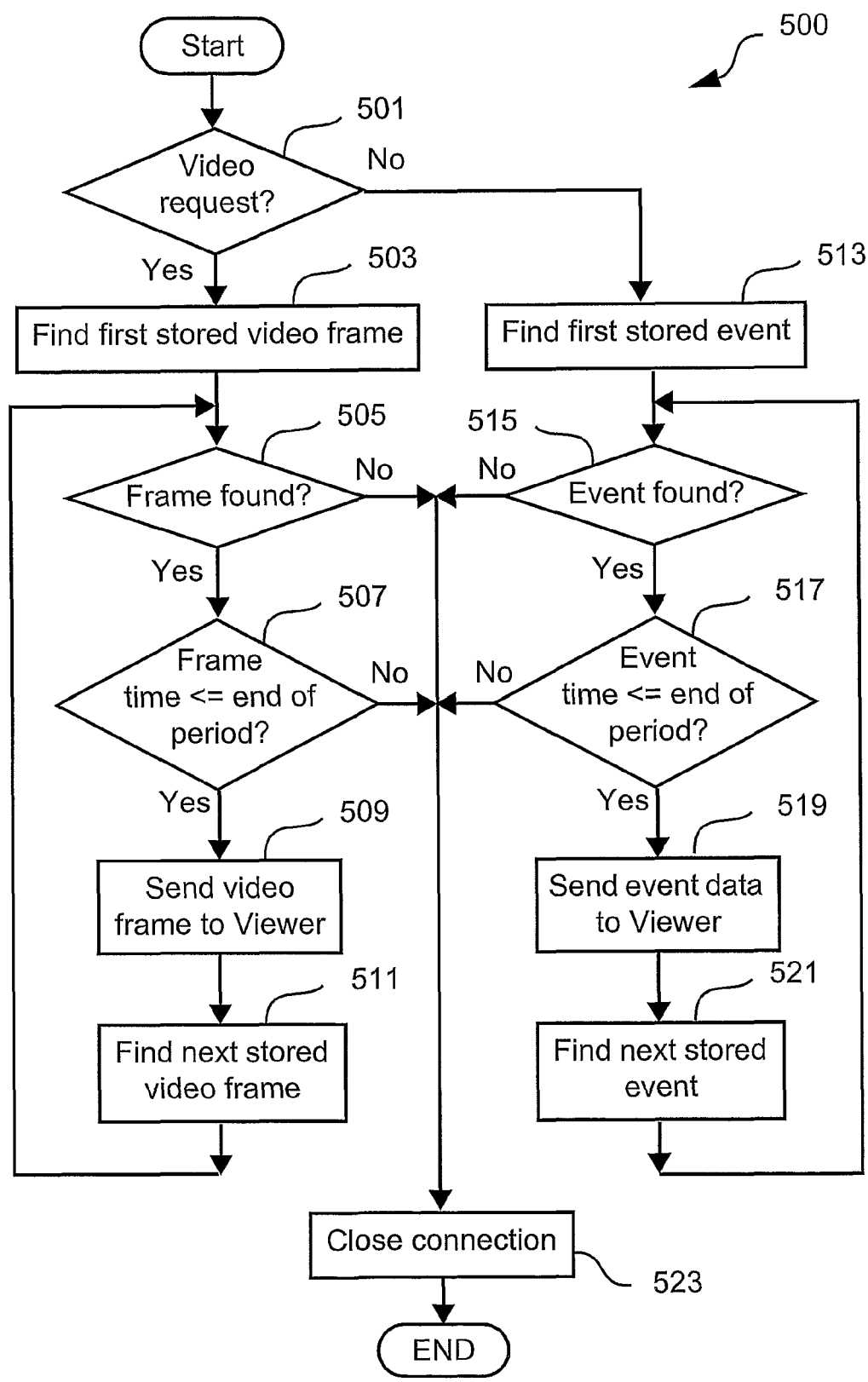
FIG. 5 is a flow diagram showing a method of processing a request for video data or event data.

The method 500 of processing a request for video or event data, as executed at step 403, will now be described with reference to FIG. 5. The method 500 may be implemented as software resident on the hard disk drive 310 of the storage server 300 and being controlled in its execution by the processor 305. The method 500 begins at step 501, where if the processor 305 determines that the received request is a request for video data, then the method 500 proceeds to step 503. Otherwise, the method 500 proceeds to step 513. At step 503, the processor 305 searches through the video data stored in the hard disk drive 310 to find video data representing a first stored video frame corresponding to a camera 112-115 referenced by the request at or after the start time provided within the request. Then at the next step 505, if the processor 305 determines that a frame was found then the method 500 proceeds to step 507. Otherwise, the method 500 proceeds to step 523.

At step 507, if the processor 305 determines that the time of the frame found at step 503 is less than or equal to the end time provided with the request, then the method 500 proceeds to step 509. Otherwise, the method 500 proceeds to step 523. The method 500 continues at step 509, where the processor 305 sends the video frame to the viewer 200, via the communications network 220. At the next step 511, the processor 305 searches the hard disk drive 310 for the next stored video frame corresponding to the camera 112-115 referenced by the request. The method 500 then returns to step 505 following step 511.

At step 513, the processor 305 searches through all recorded events stored in the hard disk drive 310 to find a first stored event corresponding to the camera 112-115 referenced by the request at or after the start time provided within the request. Then at step 515, if the processor 305 determines that an event was found, the method 500 proceeds to step 517. Otherwise, the method 500 proceeds to step 523. At step 517, if the processor 305 determines that the time of the event is less than or equal to the end time provided within the request then the method 500 proceeds to step 519. Otherwise, the method 500 proceeds to step 523.

At step 519, the processor 305 sends the data associated with the event to the viewer 200. Then at the next step 521, the processor 305 searches for the next event stored in the hard disk drive 310 and corresponding to the camera 112-115 referenced by the request. Following step 521 the method 500 returns to step 515. The method 500 concludes at step 523, where the processor 305 closes the connection established by the viewer 200 between the viewer 200 and the storage server 300.

3.0 Viewer

The viewer 200 includes viewer application software resident on the hard disk drive 210 and being controlled in its execution by the processor 205. The viewer application software may execute under a Windows™ operating system. The viewer application software provides local or remote access across the computer network 220 to both live and recorded video data and event data captured by the cameras 112-115 and provided over the network 220 by the camera servers 109-111.

The viewer 200 and the viewer application software resident and executed thereon, will hereinafter be generically referred to as the viewer 200, excepting where explicitly distinguished.

Figure 6:
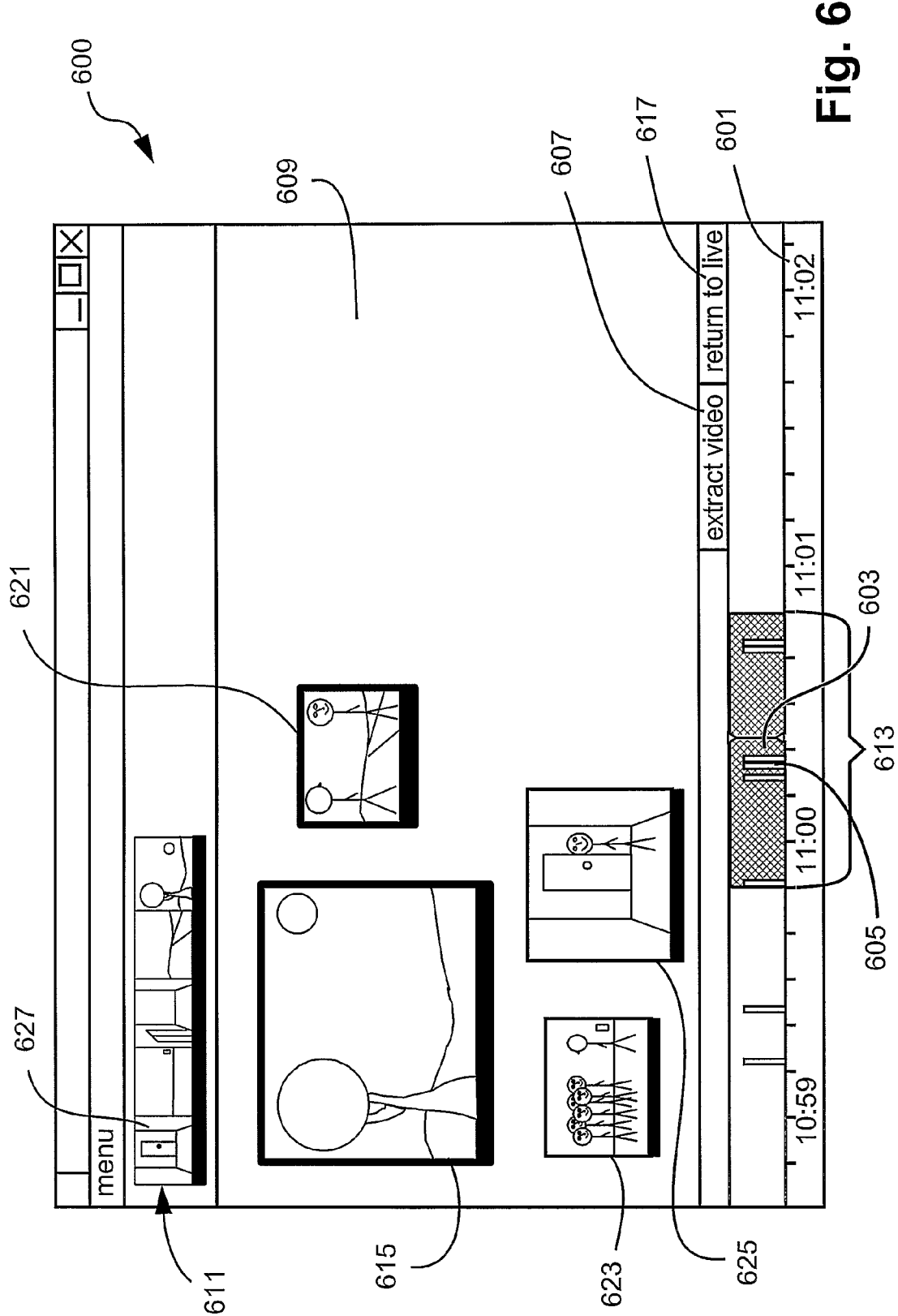
FIG. 6 shows a user interface for use with the viewer of FIG. 2.

The viewer 200 may utilise a user interface 600, as shown in FIG. 6. The user interface 600 may be displayed in a Windows™ window on the display device 214. The user interface 600 comprises a time line 601, a playhead 603, event icons (e.g., 605), time line buttons 607 and 617, a layout view 609 and a camera list 611.

3.1 Time Line

The time line 601 contains a representation of a period of time in the past. Using controls not shown in the FIG. 6 and the mouse 203, the time line 601 may be scrolled back into the past and forward up to a current time. The time line 601 may also be used to zoom in to display a smaller time period in greater detail, and to zoom out to show a greater time period in less detail.

The user may select a period of time in the visible portion of the time line 601 by dragging the mouse 203 in a conventional manner over the time line 601 from one extreme of the selected period to the other. In this instance, the selected period appears as a shaded region transparently covering the time line 601. For example, as seen in FIG. 6, a middle portion of the timeline 601 is highlighted showing the selected time period 613.

In response to clicking on any portion of the time line 601 using the mouse 203 in a conventional manner, the processor 205 retrieves pre-recorded video data from the hard disk drive 210 corresponding to the selected time for each currently selected video window (e.g., 615). Accordingly, the time line 601 forms a user interface enabling selection of the portion of video data corresponding to the selected time.

3.2 The Playhead

The playhead 603 is a vertical bar with enlarged ends. The playhead 603 is positioned at the time of the video data currently being played in a selected video window (e.g., 615). This position is referred to as "the live position". If the live position is outside the period covered by a currently visible portion of the time line 601, the playhead 603 is not displayed.

3.3 The Event Indicators

Each event that occurred within the period covered by the time line 601 is displayed in the form of an event icon (e.g., 605), extending upwards from the base of the time line 601. The colour of the event icon 605 is determined by the priority of the event which the event icon 605 represents. When one or more video windows (e.g., 615) are selected in the layout 609, event icons corresponding to cameras 112-115 which are not selected are shown in a darker shade of the colour of the corresponding event bar. Accordingly, the time line 601 comprises event icons each representing an event that occurred.

3.4 Time Line Buttons

Directly above the time line 601 are time line buttons including an "Extract Video" button 607 and a "Return to Live" button 617. The Extract Video button 607 is active when one or more video windows (e.g., 615) are selected. When pressed using the mouse 203, for example, the Extract Video button 607 executes a method 700 of storing video data in a video file, which will now be described with reference to FIG. 7.

Pressing the Return to Live button 617 using the mouse 203, for example, returns the playhead 603 to the live position, and stops all selected video windows (e.g., 615) from receiving pre-recorded video data. The selected video window (e.g., 615) is then connected directly to receive live video data from the camera server 109-111 associated with the selected window 615.

3.5 Layout View

The layout view 609 may be used for viewing one or more streams of video data. Each stream of video data is associated with a particular video window (e.g., 615) which is given a set of co-ordinates within the layout view 609. Each video window has controls, which allow the particular video window to be resized in a conventional manner. Each video window also has a context menu, which is typically accessed by clicking the light mouse button on the particular video window in a conventional manner. The context menu typically contains an option that allows the video window to be deleted from the layout 609.

The viewer 200 maintains a list of layouts within the hard disk drive 210. Each of the layouts contains a list of video windows (e.g., 615) and associated co-ordinates within the layout 609. When a layout is selected, all video windows currently present in the layout view 609 are removed, and new video windows corresponding to the selected layout are created in positions indicated within the selected layout. For the example of FIG. 6, the description of the layout currently being displayed in the layout view 609 indicates that the currently selected layout comprises four video windows 615, 621, 623 and 625. The video windows 615 and 621 appear with thicker borders in the example of FIG. 6 indicating that these video windows 615 and 621 have been selected.

3.6 Camera List

The camera list 611 displays all of the cameras 112-115 that are present in the system 100. Details of the cameras 112-115 to be included in the camera list 611 may be downloaded by the viewer 200 as part of a login process. Each camera 112-115 is displayed as an icon (e.g., 627) which contains a thumbnail image representative of a scene being viewed by the associated camera.

Each camera 112-115 may be selected for viewing by clicking the associated icon (e.g., 627) anywhere within the region of the associated icon. Multiple cameras 112-115 may be selected by clicking on additional icons while having the Control key of the keyboard 202 depressed.

The icons (e.g., 627) in the camera list 611 may be dragged to the layout view 609 in order to add a new video window corresponding to the selected camera 112-115 to the currently selected layout. The new video window may be positioned in the layout using the mouse 203.

4.0 Viewer Processes

Figure 7:
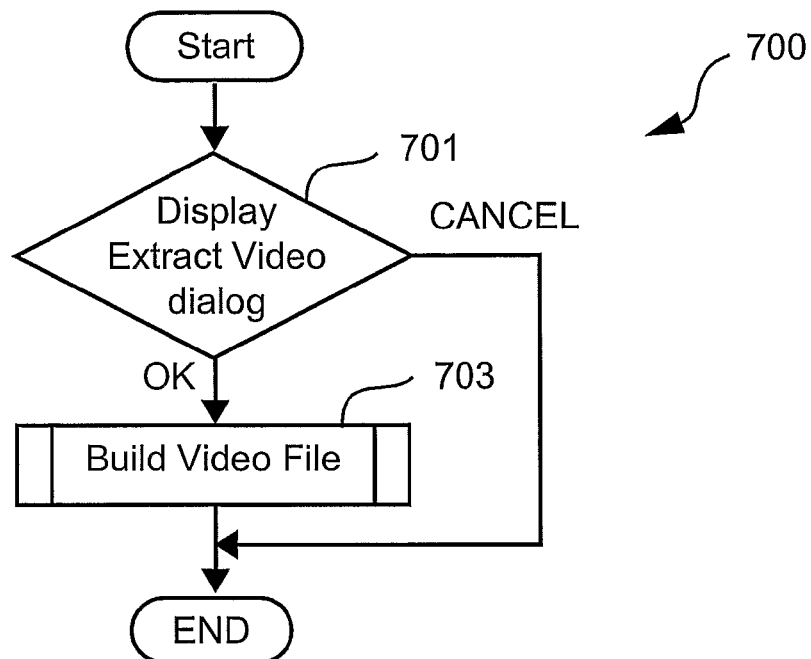
FIG. 7 is a flow diagram showing a method of storing video data in a video file.

The method 700 of storing video data in a video file will now be described below with reference to FIG. 7. The method 700 may be implemented as software resident in the hard disk drive 210 of the viewer 200 and being controlled in its execution by the processor 205. The method 700 is executed by the processor 205 in response to the Extract Video button 607 being pressed using the mouse 203, for example.

Figure 8:
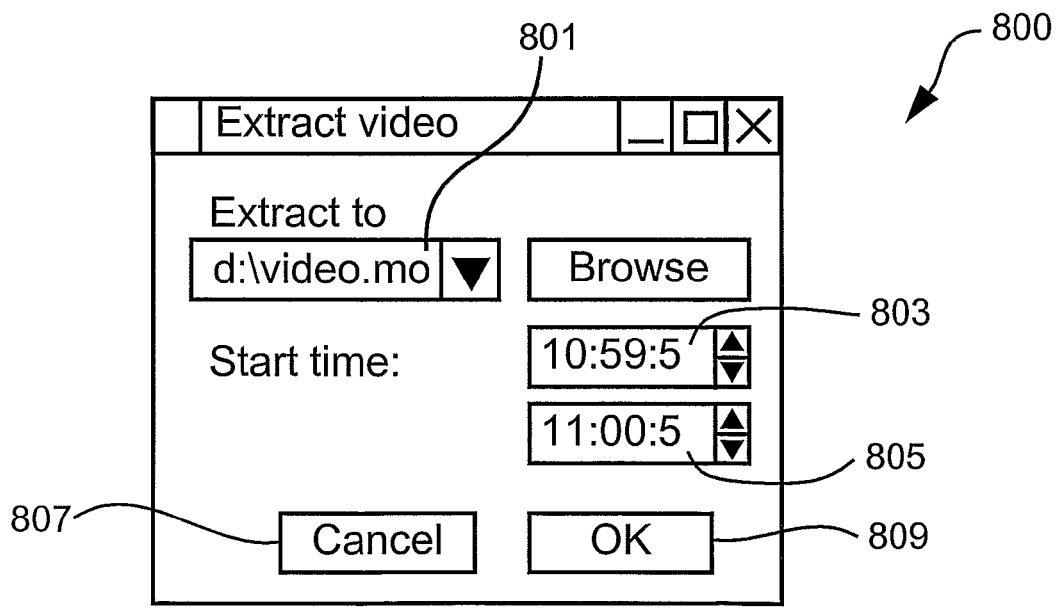
FIG. 8 shows an extract video data dialog.
Figure 9:
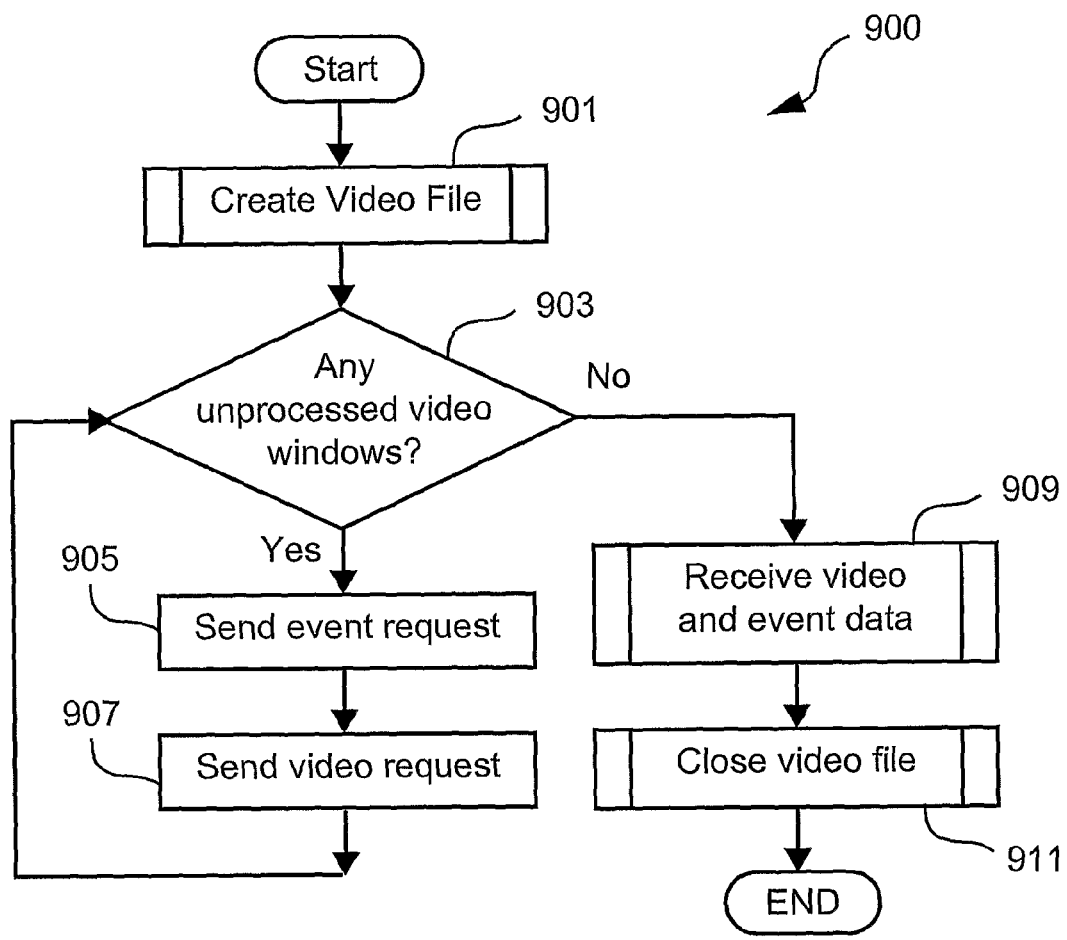
FIG. 9 is a flow diagram showing a method of building a video file as executed in the method of FIG. 7.

The method 700 begins at step 701, where the processor 205 displays an Extract Video dialog 800, as seen in FIG. 8. The Extract Video dialog 800 comprises a text entry box 801 for entering the name of a video file in which extracted video data is to be stored. The dialog 800 also comprises text entry boxes 803 and 805 for adjusting start and end times for video data to be stored. The dialog 800 also comprises a "Cancel" button 807. If the user presses the "Cancel" button 807, the method 700 concludes. If the user clicks an "OK" button 809 of the dialog 800, then the method 200 proceeds to step 703. At step 703, the processor 205 executes a method 900 of building a video file for storing the extracted video data, which will now be described in detail below with reference to FIG. 9.

The method 900 may be implemented as software resident in the hard disk drive 210 and being controlled in its execution by the processor 205. In the method 900, the processor 205 requests the storage server 300 to supply all event data that is associated with the camera 112-115 corresponding to a currently selected video window (e.g., 615). The processor 205 also requests the storage server 205 to supply all video data captured by the camera 112-115 corresponding to the currently selected video window, within the time period defined in the dialog 600 (i.e., end time minus start time). Accordingly, the portion of video data corresponding to the time period defined in the dialog 600 may be retrieved from storage prior to the video data being stored in the video file built in accordance with the method 900.

Figure 10:
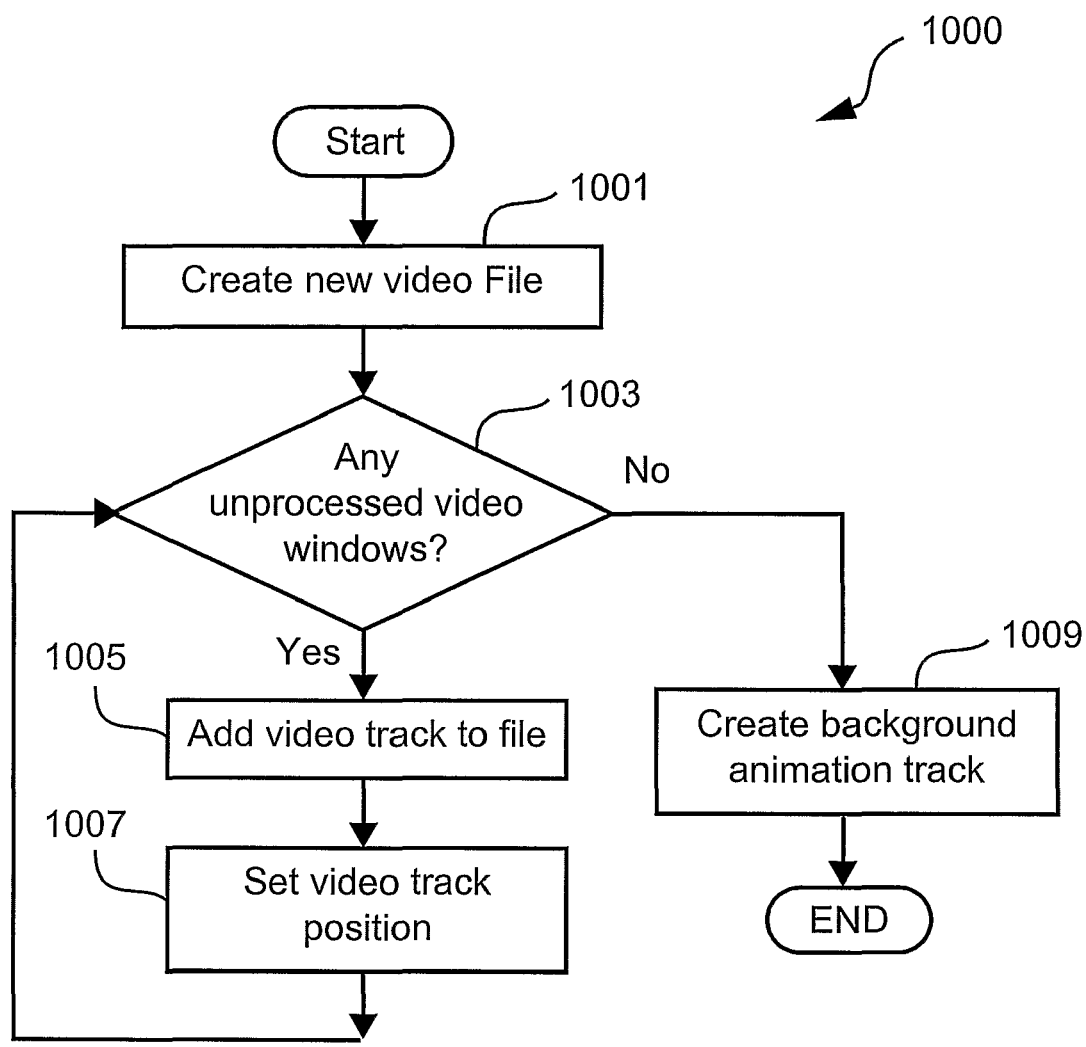
FIG. 10 is a flow diagram showing a method of creating a video file as executed in the method of FIG. 9.

The method 900 begins at step 901, where the processor 205 executes a method 1000 of creating a video file, which will be described in detail below with reference to FIG. 10. The method 1000 creates a new video file on the hard disk drive 210 with the name defined in the dialog 600. The video file created in accordance with the method 1000 contains one or more video tracks. The video file may be created in any suitable format including the QuickTime™ file format. At the next step 903, the processor 205 enters a loop that iterates over each video window that was selected by the user prior to execution of the method 700. If an unprocessed video window remains at step 903, the method 900 proceeds to step 905. Otherwise, the method 900 proceeds to step 909. At step 905, the processor 205 sends an event request to the storage server 300. The event request sent at step 905 requests all events that are associated with the camera 112-115 corresponding to the currently selected video window and which occurred during the time period defined in the dialog 800. Then at the next step 907, the processor 205 sends a video request to the storage server 300. The video request sent at step 907 requests all video data associated with the camera 112-115 corresponding to the currently selected video window and which occurred during the time period defined in the dialog 800. Following step 907 the method 900 returns to step 903.

Figure 11:
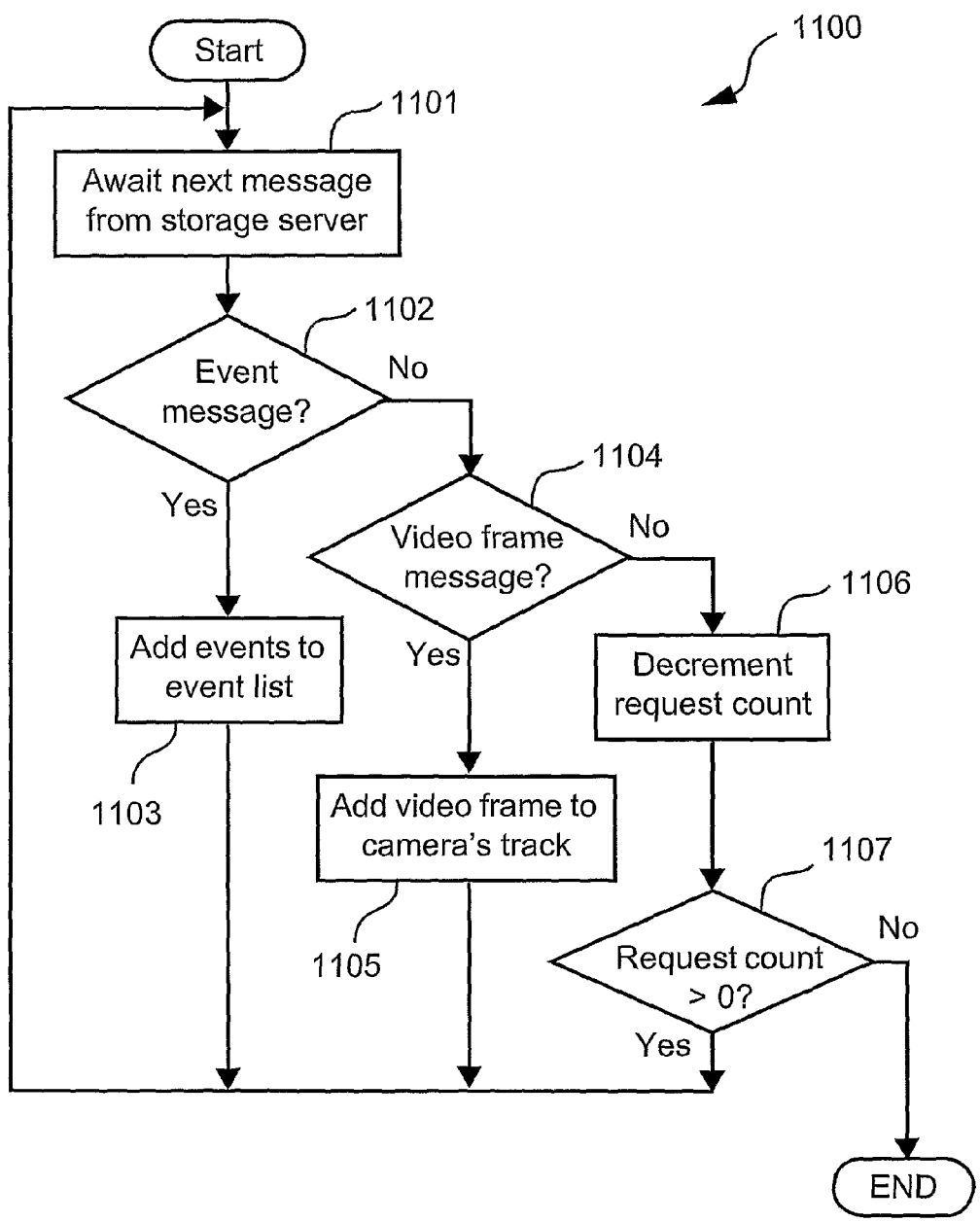
FIG. 11 is a flow diagram showing a method of retrieving video and event data as executed in the method of FIG. 9.

At step 909, the processor 205 executes a method 1100 of retrieving video and event data, which will be described below with reference to FIG. 11. The method 1100 receives the event data and video data requested at steps 905 and 907 and stores the data in the video file created at step 901. Then at step 911, the processor 205 executes a method 1200 of closing a video file, which will be described with reference to FIG. 12. The method 1200 performs all necessary operations to ensure that the video file created at step 1001 and storing the event and video data, is playable by a media player. The method 900 concludes following step 911.

The method 1000 of creating a video file, as executed at step 901, will now be described in detail below with reference to FIG. 10. The method 1000 may be implemented as software resident in the hard disk drive 210 of the viewer 200 and being controlled in its execution by the processor 205. The method 1000 begins at step 1001, where the processor 205 creates a new video file within the hard disk drive 210. The video file is created with the name entered in the text entry box 801. As described above, the video file may be created in any suitable format including to the QuickTime™ file format, and initially contains no tracks. Then at the next step 1003, the method 1000 enters a loop that iterates over each video window (e.g., 615) that was selected by the user prior to execution of the method 700. At step 1003, if an unprocessed video window remains, the method 1000 proceeds to step 1005, to process a next unprocessed video window. Otherwise, the method 1000 proceeds to step 1009. At step 1005, the processor 205 adds a video track to the video file. Then at step 1007, the processor 205 manipulates a header of the video track in order to set a position of the video track within the created video file. The position of the track is set to equal co-ordinates of the currently processed video window in the current layout (e.g., 609) on the display screen 214. The method 1000 then returns to step 1003. The configuration of the tracks added to the video file at step 1005 will be described in further detail below with reference to FIG. 13.

At step 1009, the method 1000 creates a background animation track and adds the animation track to the created video file. The background animation track may be of any suitable format including Flash™. For example, the background animation track may be configured as a Shockwave Flash™ file. The background animation track is preferably configured to hold one sample. The background animation track created at step 1009 comprises borders of any current video windows and an empty timeline (or user interface). Accordingly, the background animation track comprises a representation of any current video windows. The method 1000 concludes following step 1009.

The method 1100 of retrieving video and event data, as executed at step 909, will now be described below with reference to FIG. 11. The method 1100 may be implemented as software resident on the hard disk drive 210 of the viewer 200 and being controlled in its execution by the processor 205. The method 1100 stores the video data exported from the storage server 300 in the video file created in accordance with the method 1000. The method 1100 begins at step 1101, where the processor 205 awaits a message from the storage server 300. Since several video and event requests may have been made during execution of the method 900, in the method 1100 the processor 205 will receive a series of messages, which will contain all the requested video and event data. Each message corresponds to a particular request and contains either a single video frame, a set of event descriptions, or an indication that no more data is available for the particular request.

In response to the processor 205 detecting a message from the storage server 300 at step 1101, the method 1100 proceeds to step 1102. At step 1102, if the processor 205 determines that the received message is an event message, then the method 1100 proceeds to step 1103. Otherwise, the method 1100 proceeds to step 1104. At step 1103, the processor 205 examines the received message and extracts all event records contained therein. Each of the extracted event records is appended to an event list configured within the hard disk drive 210. The event list is associated with the created video file and contains all events that have been received by the viewer 200 for the video file. Following step 1103, the method 1100 returns to step 1101.

At step 1104, if the processor 205 determines that the message received at step 1101 contains video data representing a video frame, then the method 1100 proceeds to step 1105. Otherwise, the method 1100 proceeds to step 1106. At step 1105, the processor 205 adds the video data received with the message at step 1101 to a video track corresponding to a video window associated with the message received at step 1101. The method 1100 returns to step 1101 following step 1105.

At step 1106, the processor 205 decrements a request count representing the number of requests sent to the storage server 300 during the method 900. Then at step 1107, if the processor 205 determines that all of the previously opened connections between the viewer 200 and the storage server 300 are now closed then the method 1100 concludes. Otherwise, the method 1100 returns to step 1101.

Figure 12:
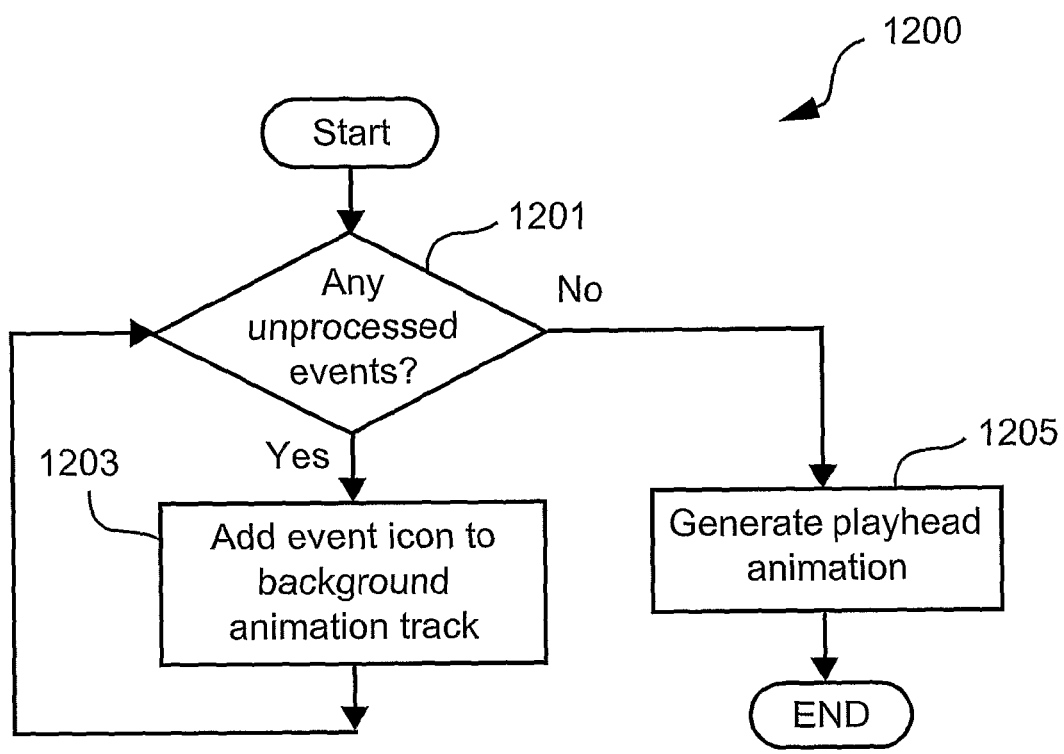
FIG. 12 is a flow diagram showing a method of closing a video file as executed in the method of FIG. 9.

The method 1200 of closing a video file, as executed at step 911, will now be described with reference to FIG. 12. The method 1200 may be implemented as software resident in the hard disk drive 210 of the viewer 200 and being controlled in its execution by the processor 205. The method 1200 is executed following conclusion of the method 1100. The method 1200 begins at step 1201, where the processor 205 enters a loop, which iterates over each event within the event list associated with the video file. If there are unprocessed events remaining in the event list at step 1201 then the method 1200 proceeds to step 1203. Otherwise, the method 1200 proceeds to step 1205. At step 1203, the processor 205 adds an event icon corresponding to an event currently being processed (i.e., the "current event") to the background animation track in the video file. The event icon added to the background animation track at step 1203 is similar to the event icons (e.g., 601) of the time line 601. The event icon added to the background animation track is a coloured vertical bar, with the colour indicating the priority of the current event. The event icon is positioned at a point on the timeline of the background animation track that corresponds to the time at which the current event occurred.

The event icon added to the background animation track at step 1203 is also associated with a method 1700 (see FIG. 17) of displaying an event description, a method 1800 (see FIG. 18) of displaying one or more frames of video data at normal playback rate (i.e., at the same frame rate as the video data was originally captured) and a method 1900 (see FIG. 19) of displaying one or more frames of video data at normal playback rate. Accordingly, mouse actions in relation to such an event icon will result in one or more of the methods 1700, 1800 and 1900 being executed by the processor 205. For example, in response to a mouse pointer being moved from outside an event icon to inside the event icon, the processor 205 executes the method 1700 of displaying an event description, which will be described below with reference to FIG. 17. Further, in response to an event icon being clicked using the mouse 203 in a conventional manner, the processor 205 executes the method 1800 of displaying one or more frames of video data at normal playback rate (i.e., at the same frame rate as the video data was originally captured), which will be described below with reference to FIG. 18. Accordingly, frames of the portion of video data corresponding to an event are displayed upon selection of the event icon corresponding to the event. In some instances only one frame (i.e., a single frame) is displayed. Alternatively, a sequence of frames near the event represented by the event icon may be displayed.

Figure 19:
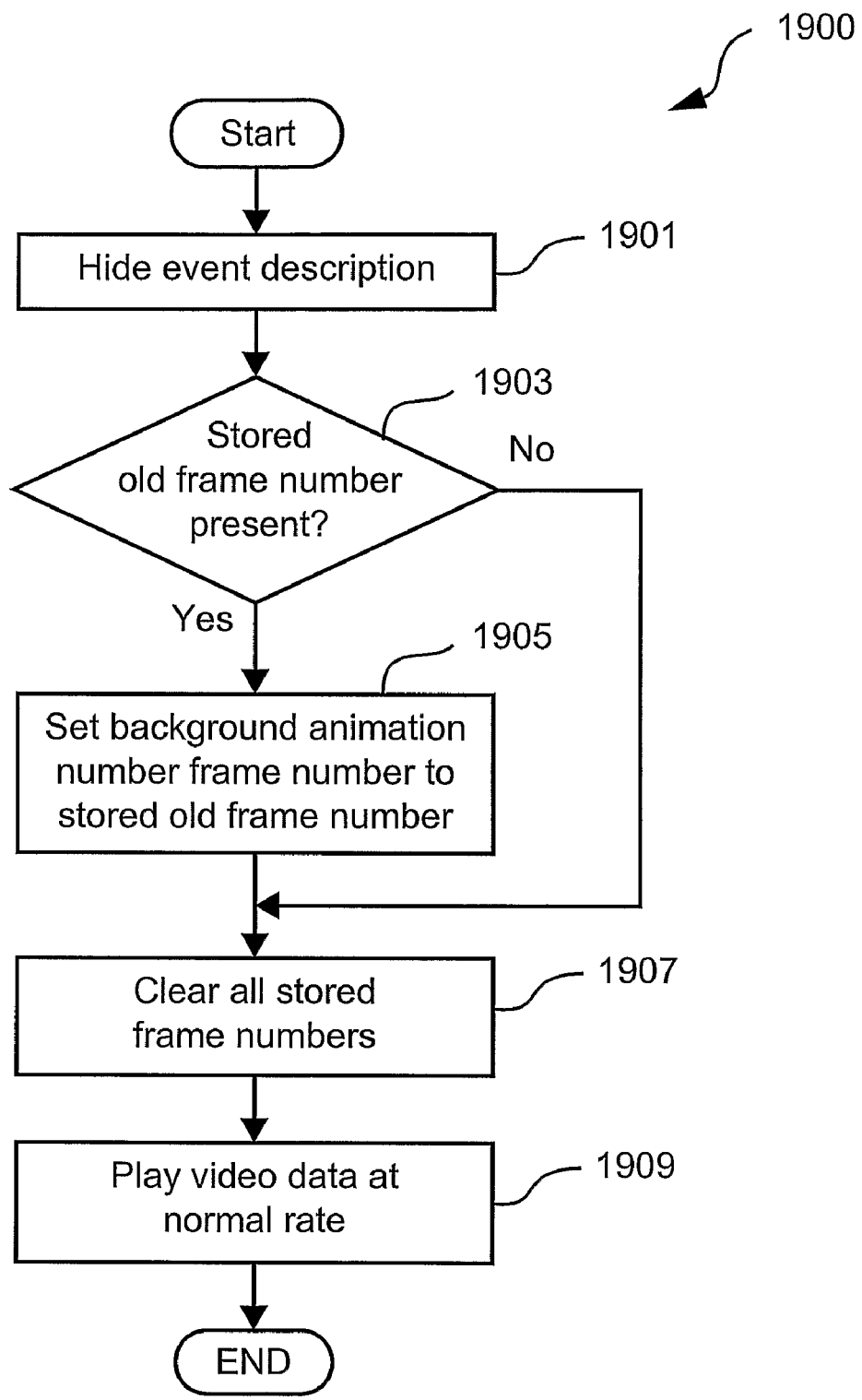
FIG. 19 is a flow diagram showing another method of displaying one or more frames of video data at normal playback rate.

Still further, in response to a mouse pointer being moved from inside an event icon to outside the event icon, the processor 205 executes the method 1900 of displaying one or more frames of video data at normal playback rate, which will be described below with reference to FIG. 19.

Following step 1203, the method 1200 returns to step 1201. At step 1205, the processor 205 adds a playhead object to the background animation track associated with the video file, and generates (or creates) an animation for use in the display of one or more frames of video data associated with the current event. As described above, the background animation track comprises borders of any current video windows and an empty timeline. Accordingly, the created animation represents any current video windows. This animation also comprises a set of frames that animate the playhead (e.g., 603) traveling from a left edge to a right edge of the time line added to background animation track. The animation is timed to synchronise with the playback of the one or more frames of video data associated with the current event. These one or more frames of video data may be played back at the same frame rate as at which the video data was originally captured or at a different frame rate to which the video data was originally captured. The animation is typically generated at thirty (30) frames per second, so that the number of frames generated is equal to thirty (30) times the number of seconds covered by the video file. After generating the animation, the method 1200 concludes.

5.0 The Video File

The video file used for storing the video data in accordance with the method 700 is typically in a format that may be played back using a commonly available video-player such as the Apple QuickTime™ media player.

The video file comprises a media data area and a video file index. The media data area of the video file comprises the extracted video data as well as a background animation itself. An example of a video file index 1300 will now be described below with reference to FIG. 13. The video file index 1300 comprises data describing tracks and their relative positions, and points to locations of relevant data in the media data area.

The video file index 1300 is configured as a tree structure. The video file index 1300 comprises atoms (e.g., 1301), which may either store data or comprise one or more child atoms (e.g., 1302, 1304). Each atom begins with a header (e.g., 1306) comprising the size of the atom in bytes including the header. Each atom also comprises a four-character code (e.g., 'mdia') indicating a type for the atom.

Figure 13:
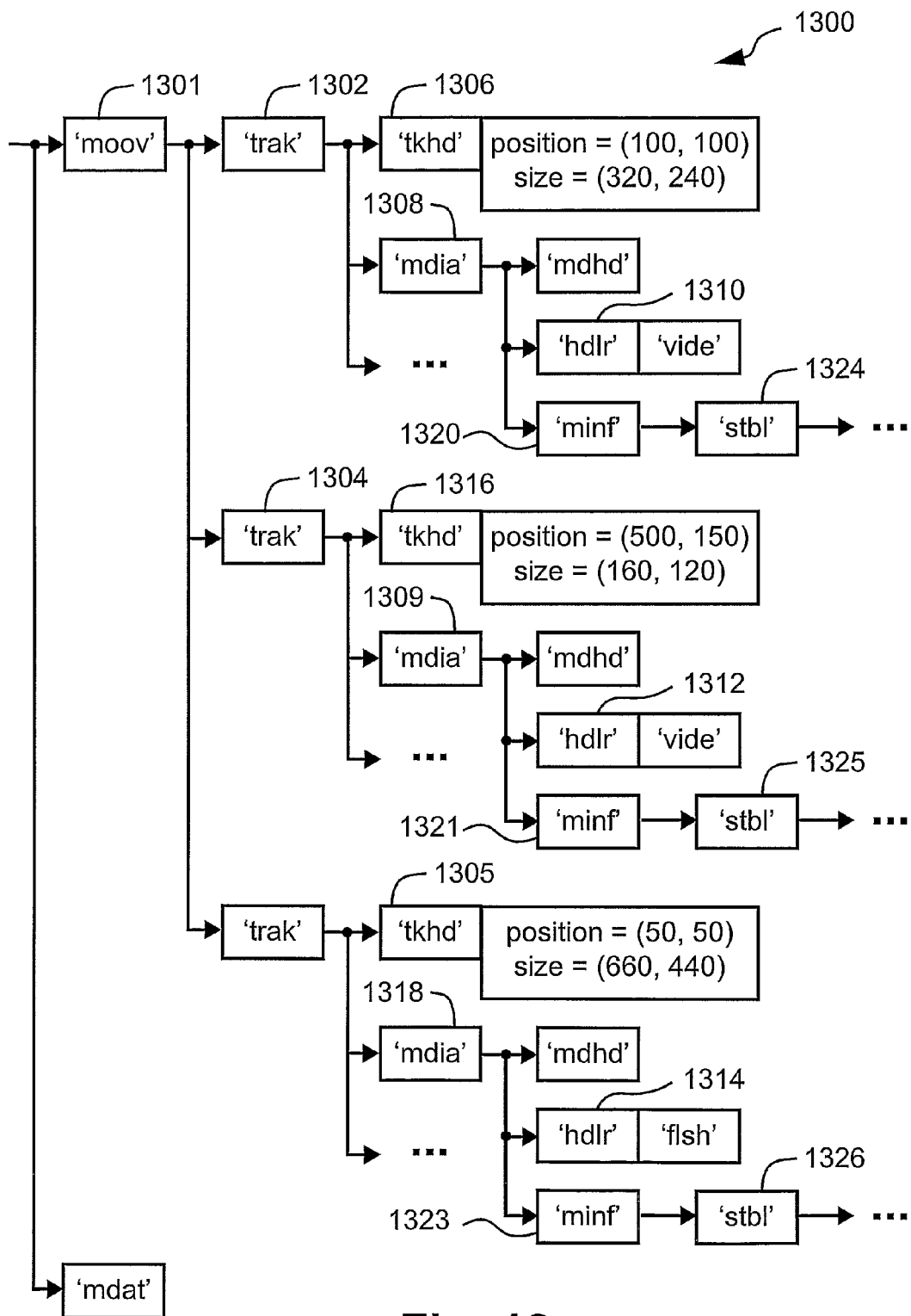
FIG. 13 shows the structure of a video file track index.

The index 1300 of FIG. 13 comprises three track atoms 1302, 1304 and 1305 of type 'trak'. The track atoms 1302 and 1304 represent a video track containing video data and the track atom 1305 represents a background animation track. Each of the track atoms 1302 and 1304 comprises a track header atom 1306 and 1316, respectively, of type 'tkhd'. The track header atoms 1306 and 1316 among other things, store the position and size of tracks associated with each of the track atoms 1302 and 1304. In FIG. 13, this position and size information is described using an (x,y) co-ordinate pair to represent the top-left corner of the associated track, and an (x,y) vector to represent the width and height of the track.

The track atoms 1302, 1304 and 1305 also comprise media atoms 1308, 1309 and 1318, respectively, of type 'mdia'. The media atoms 1308, 1309 and 1318 each comprise media information atoms 1320, 1321 and 1323, respectively, of type 'minf'. The media information atoms 1320, 1321 and 1323 each comprise sample table atoms 1324, 1325 and 1326, respectively, of type 'stbl'. The sample table atoms 1324, 1325 and 1325 each contain information about each frame of video data stored within the corresponding track, including the duration of each frame. Accordingly, each of the tracks in the video file may have the same or different frame rates. The media atoms 1308, 1309 and 1318 each comprise handler atoms 1310, 1312 and 1314, respectively, of type 'hdlr'. The handler atoms 1310, 1312 and 1314 among other things, describe the format of media described by the tracks associated with the track atoms 1302, 1304 and 1305, respectively. In the example of FIG. 13, the handler atoms 1310 and 1312 for the track atoms 1302 and 1304, respectively, indicate a video track using the code 'vide'. The handler atom 1314 for the track atom 1305 indicates a background animation track using the code 'fish'.

A media player (e.g., the Apple QuickTime™ media player) typically contains separate components that are responsible for rendering video data and animation data. These components are called media handlers. A video media handler is used to render video data, and an animation media handler is used to render animation data. In addition, an animation media handler is able to respond to user generated events such as moving or clicking the mouse.

Figure 14:
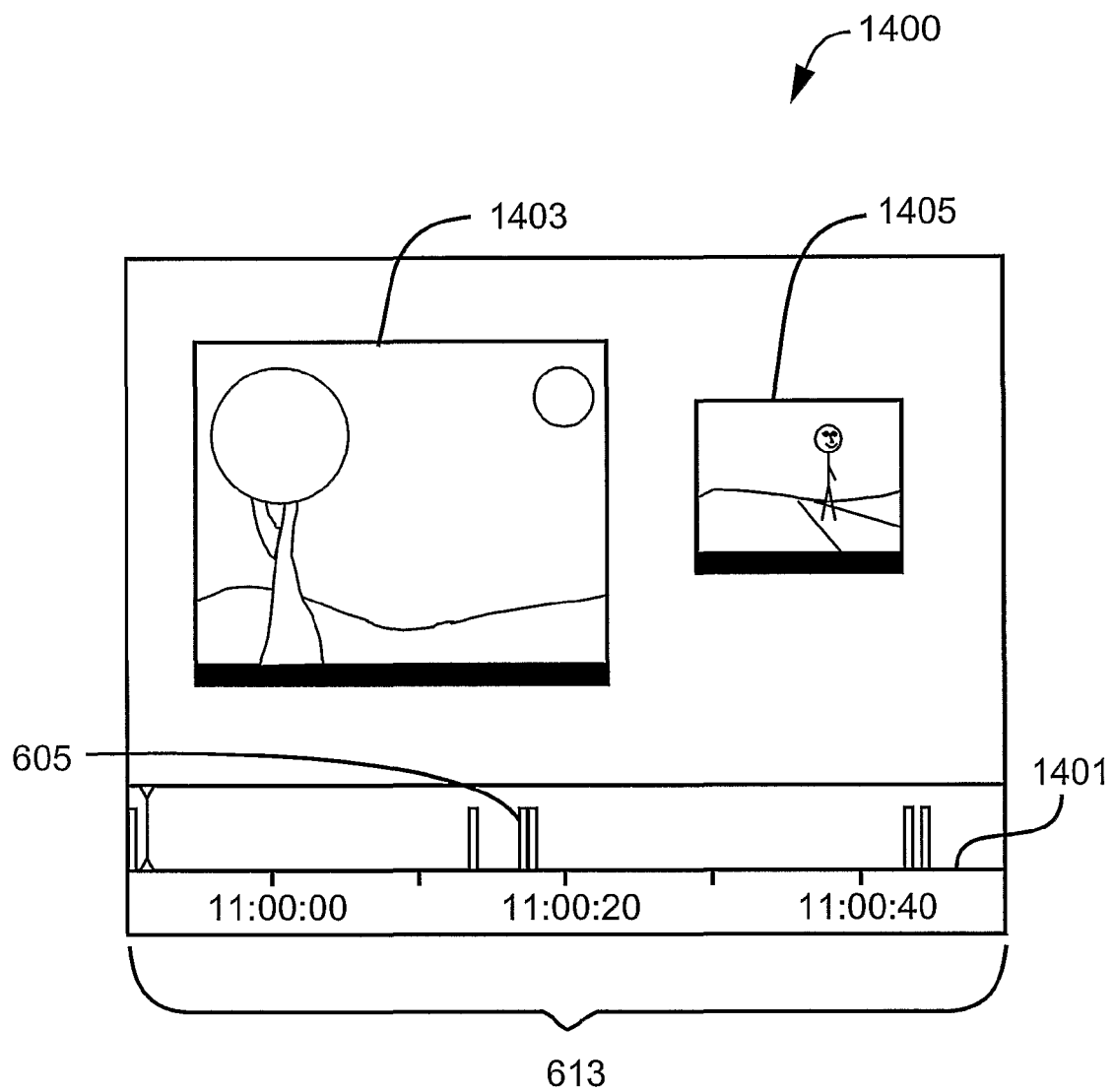
FIG. 14 shows a video file.

FIG. 14 shows a video file 1400. The video file 1400 is typically contained within a window (not shown). Many media players have a full-screen mode where menus and other controls are not normally visible. The video file 1400 as shown in FIG. 14 represents such a full-screen mode. The video file 1400 comprises a timeline 1401 covering the time period 613 highlighted in the example of FIG. 6. The video file 1400 comprises two tracks represented by video windows 1403 and 1405 of the video file 1400. The video windows 1403 and 1405 correspond to the two video windows 615 and 621, respectively, which are selected in the example of FIG. 6. The video file 1400 also comprises event icons (e.g., 1408) representing each event (e.g., 605) present within the selected time period 613 of the example of FIG. 6. When the user hovers the pointer of the mouse 213 over one of the event icons of the video file 1400, an event description is displayed in the timeline 1401, and a preview of the video data captured at the time of the event is displayed in the video windows 1403 and 1405. The preview typically consists of one or more frames (i.e., a single frame or a sequence of frames) of video data covering the time period immediately before and after the event. The event icons are associated with the methods 1700, 1800 and 1900 described above. Accordingly, the video file 1400 is a single video file with video data (i.e., corresponding to the video windows 1403 and 1405) and data representing the user interface, in the form of the timeline 1401, stored therein.

Figure 15:
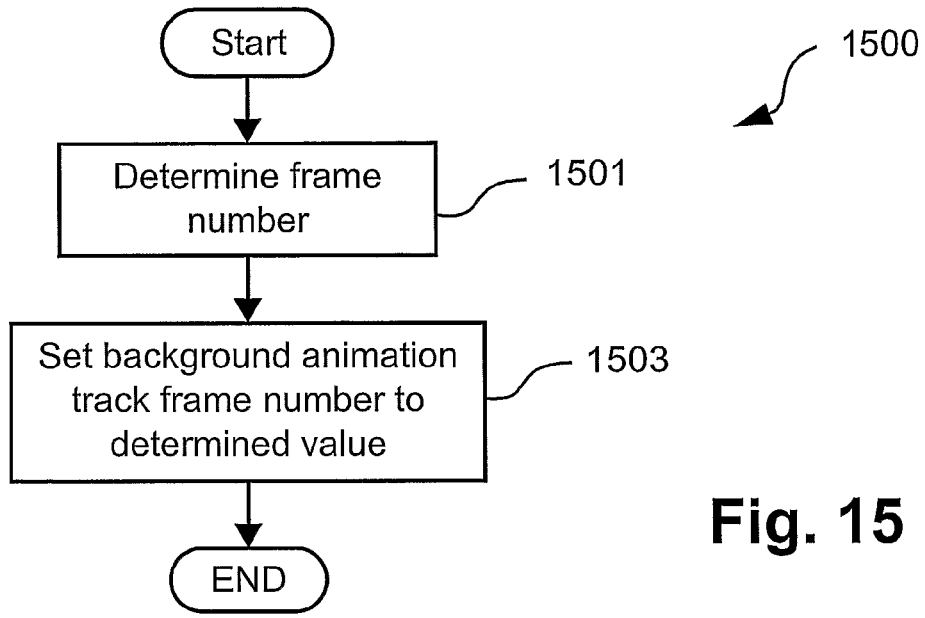
FIG. 15 is a flow diagram showing a method of resetting current playback time.

In response to a user clicking on the timeline 1401 using the mouse 203 in a conventional manner, the processor 205 executes a method 1500 of resetting current playback time, which will be described below with reference to FIG. 15.

Figure 16:
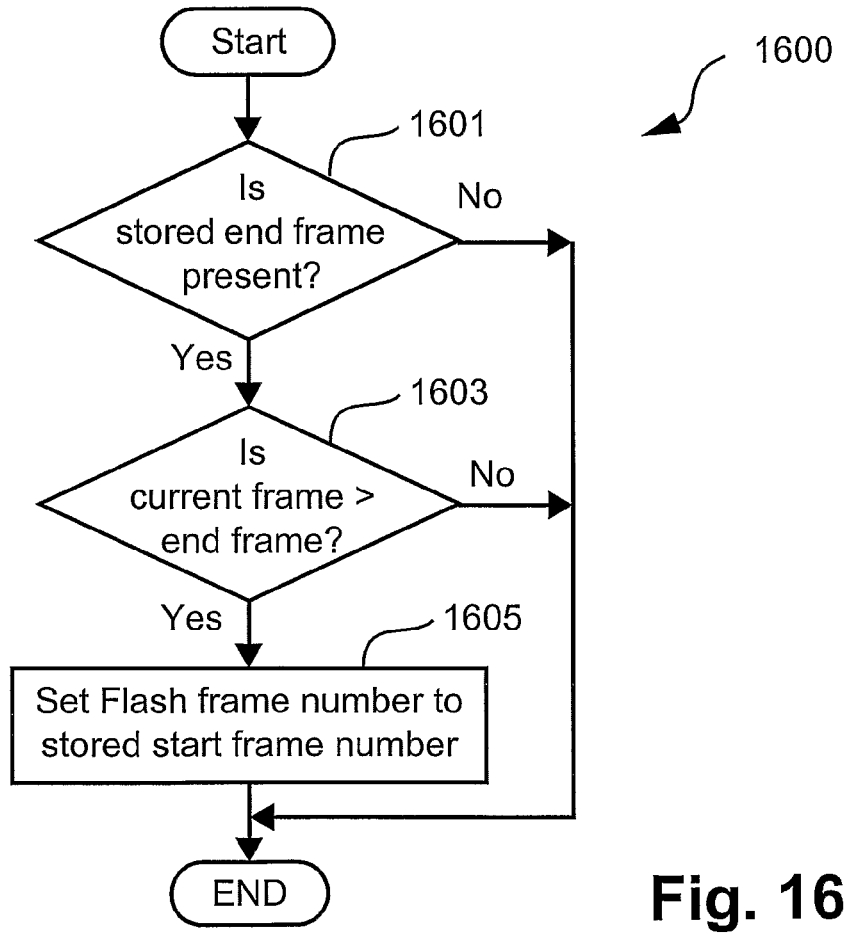
FIG. 16 is a flow diagram showing a method of creating a short looping video clip.

Whenever a new frame of video data is displayed in the background animation track of the video file 1400, the processor 205 executes a method 1600 of creating a short looping video clip, which will be described below with reference to FIG. 16.

The method 1500 of resetting current playback time will now be described with reference to FIG. 15. The method 1500 may be implemented as software resident in the hard disk drive 210 of the viewer 200 and being controlled in its execution by the processor 205. The method 1500 is executed by the animation media handler responsible for rendering the background animation track of the video file 1400. The method 1500 sets current playback time for the background animation track of the video file (e.g., 1400) to a selected time represented by the position of the mouse pointer on the timeline 1401 when the user clicked on the timeline 1401. The method 1500 begins at step 1501, where the media handler executed by the processor 205 determines a frame number corresponding to the time selected on the timeline 1401. The frame number is determined in accordance with Equation (1) as follows:

$$\text{frame\_number} = (x\_pos/x\_width) * \text{total\_frames} \qquad (1)$$

where x_pos represents a horizontal position of the mouse pointer relative to the left edge of the time line 1401, x_width represents total width of the timeline 1401 and total_frames represents the number of frames of video data present in the background animation track. The frame number determined at step 1501 will be referred to as the "current background animation track" frame number. The method 1500 continues at the next step 1503, where the media handler executed by the processor 205 moves to a frame of the background animation track to the frame represented by the current background animation track frame number determined at step 1501. As a result, the playing position of each of the video tracks of the video file (e.g., 1400) is also set to correspond to the time of the frame represented by the current background animation track frame number determined at step 1501.

Figure 17:
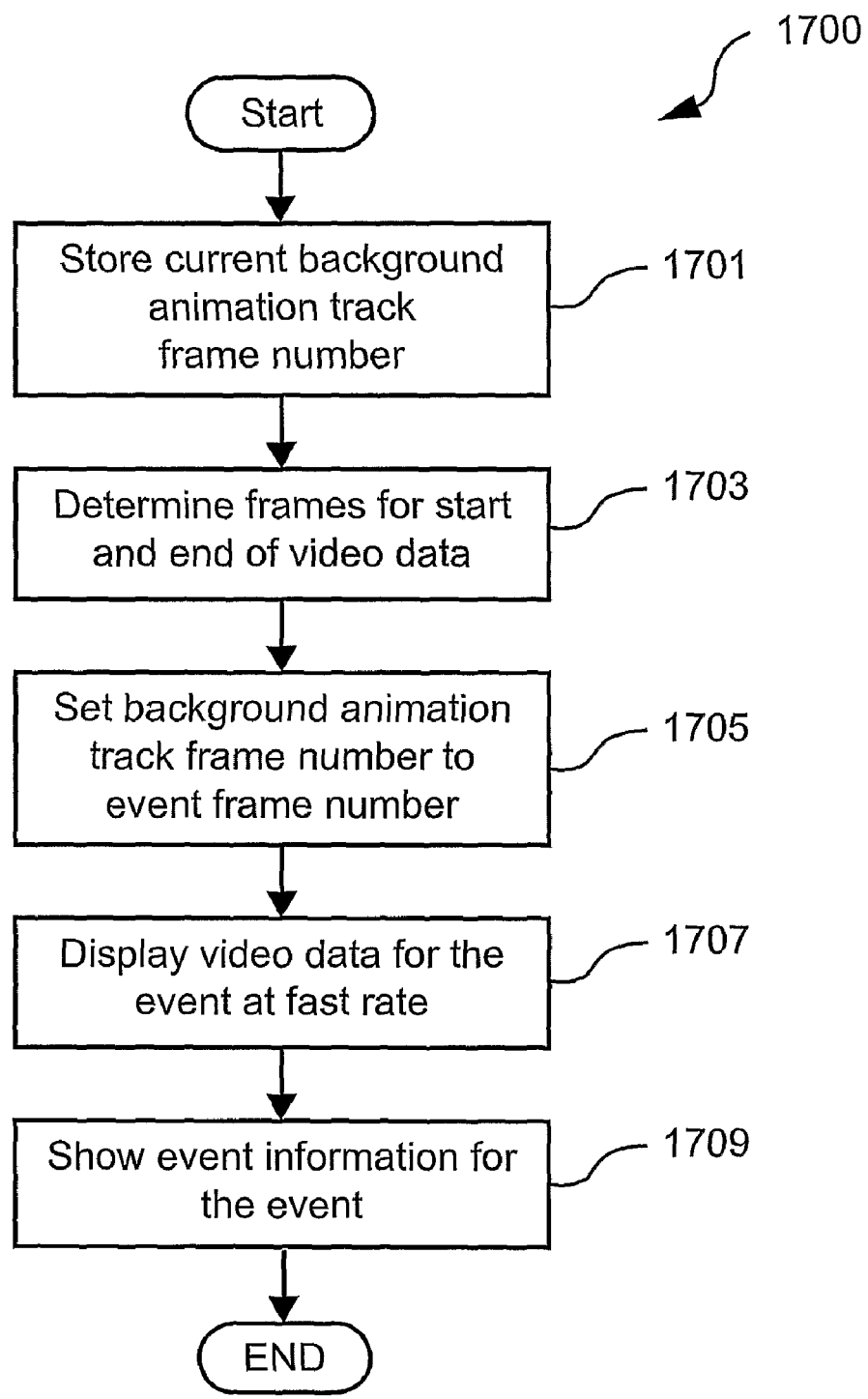
FIG. 17 is a flow diagram showing a method of displaying an event description.

The method 1700 of displaying an event description will now be described below with reference to FIG. 17. The method 1700 may be implemented as software resident in the hard disk drive 210 of the viewer 200 and being controlled in its execution by the processor 205. The method 1700 is executed by the animation media handler responsible for rendering the background animation track of the video file (e.g., 1400). The method 1700 is executed whenever a pointer of the mouse 203 moves from a region outside an event icon (e.g., 1408) representing an event to a region inside the event icon.

The method 1700 begins at step 1701, where the media handler stores the current background animation track frame number in a global variable called "oldframe". Then at the next step 1703, the media handler determines the start and end frame of video data used to preview the event represented by the event icon. The start and end frames are typically determined to correspond to one (1) second before the event and one (1) second after the event, respectively. If the desired amount of time is not available at the beginning or end of the video data, as much time as is available may be used. The start and end frames determined by the processor 205 may be stored in "startframe" and "endframe" variables, respectively, configured within memory 206.

The method 1700 continues at the next step 1705, where the media handler sets the current background animation track frame number to equal the frame number closest to the time of the event represented by the event icon. As a result, the playing position of each of the video tracks of the video file is also set to correspond to the time of the current frame. Then at the next step 1707, the media handler being executed by the processor 205 instructs the video player to display the video data at an increased rate. This rate is typically twice as fast as normal playback rate. That is, the frame rate of the displayed video data (e.g., in the form of a sequence of video frames) is different to the rate at which the displayed video data was originally captured. The method concludes at the next step 1709, where the media handler displays a description of the event on the timeline 1401, above the event icon.

Figure 18:
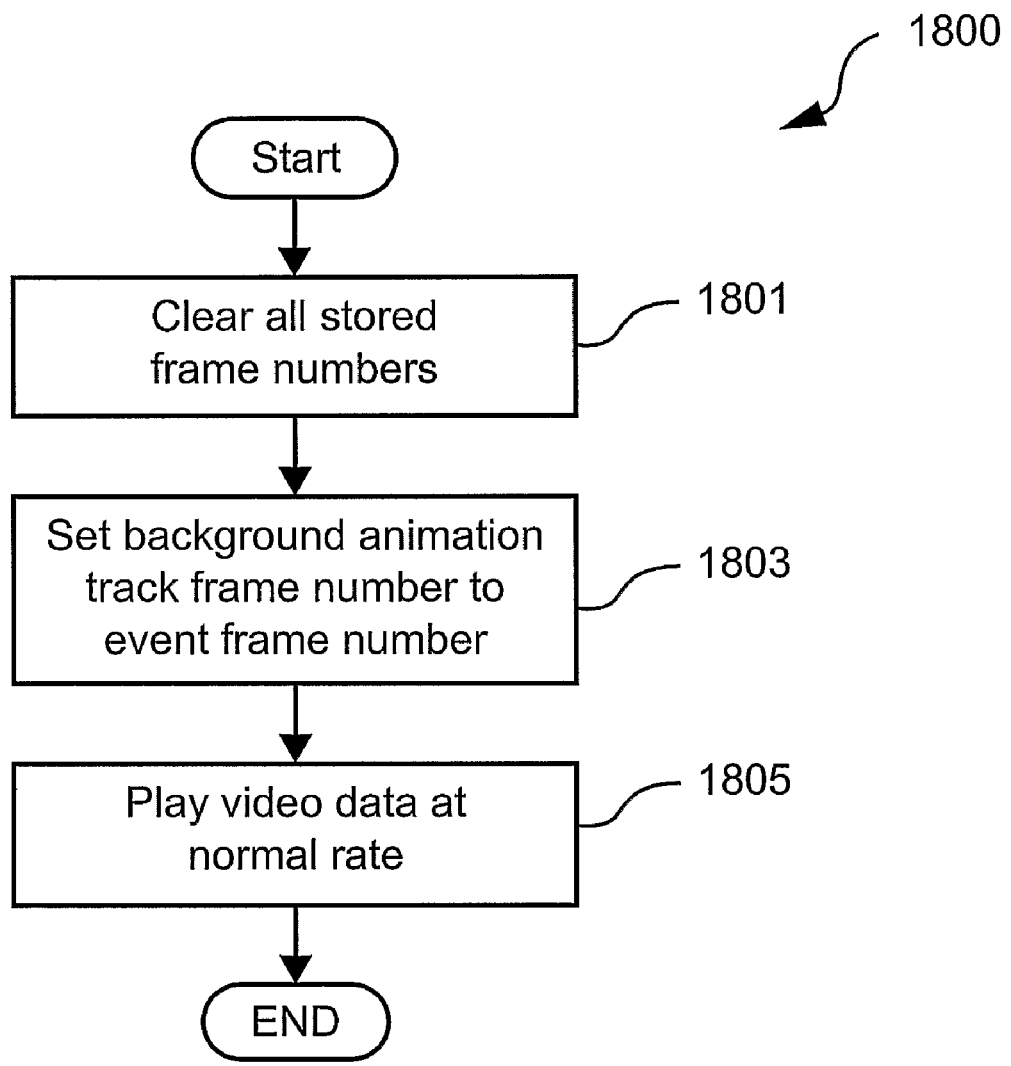
FIG. 18 is a flow diagram showing a method of displaying one or more frames of video data at normal playback rate.

The method 1800 of displaying one or more frames of video data at normal playback rate will now be described below with reference to FIG. 18. The method 1800 may be implemented as software resident on the hard disk drive 210 and being controlled in its execution by the processor 205. The method 1800 is executed by the animation media handler that is responsible for rendering the background animation track. The media handler executes the method 1800 whenever the user clicks the mouse while the mouse pointer is over an event icon (e.g., 1408). The method 1800 is typically executed subsequently to the method 1900. As such, the processor 205 assumes that the video data is currently paused and positioned at the time of the event itself.

The method 1800 begins at step 1801, where the media handler being executed by the processor 205 clears the oldframe, startframe and endframe variables defined during the method 1700 described above. At the next step 1803, the media handler sets the current background animation track frame number equal to the frame number closest to the time of the event represented by the event icon clicked by the user. Then at the next step 1805, the media handler instructs the media player being used to display the one or more frames of video data associated with the event represented by the event icon and sets the playback rate to the normal playback rate.

The method 1900 of displaying one or more frames of video data at normal playback rate, will be described below with reference to FIG. 19. The method 1900 may be implemented as software resident in the hard disk drive 210 and being controlled in its execution by the processor 205. The method 1900 is executed by the animation media handler that is responsible for rendering the background animation track. The media handler executes the method 1900 whenever a pointer of the mouse 203 moves from a region inside an event icon (e.g., 1408) to a region outside the event icon.

The method 1900 begins at step 1901, where the media handler being executed by the processor 205 hides the event description that was previously displayed in accordance with the method 1700. At the next step 1903, if the media handler determines that a frame number is stored in the oldframe variable, then the method 1900 proceeds to step 1905. Otherwise, the method 1900 proceeds to step 1907. At step 1905, the media handler being executed by the processor 205 sets the current background animation track frame number equal to the number stored in the oldframe variable. As a result, the playing position of each of the video tracks of the video file is also set to correspond to the time of the frame represented by the current background animation track frame number. Then at the next step 1907, the media handler being executed by the processor 205 clears the oldframe, startframe and endframe variables. The method 1900 concludes at step 1909, where the media handler instructs the media player to continue playing the one or more frames of video data for the event represented by the event icon and sets the playback rate to the normal playback rate.

A method 1600 of creating a short looping video clip represented by one or more frames of video data will now be described with reference to FIG. 16. The method 1600 is executed by the animation media handler that is responsible for rendering the background animation track. The media handler executes the method 1600 whenever a new frame of video data is displayed. The method 1600 creates a short looping video clip when an event preview is active. The method begins at step 1601, where if the media handler being executed by the processor 205 determines that the endframe variable contains a value, then the media handler proceeds to step 1603. Otherwise, the method 1600 concludes. At step 1603, if the media handler determines that the current background animation track frame number is greater than the value in the endframe variable then the method 1600 proceeds to step 1605. Otherwise, the method 1600 concludes. The method 1600 concludes at step 1605, where the method 1600 sets the current frame number equal to the value in the startframe variable.

Figure 20:
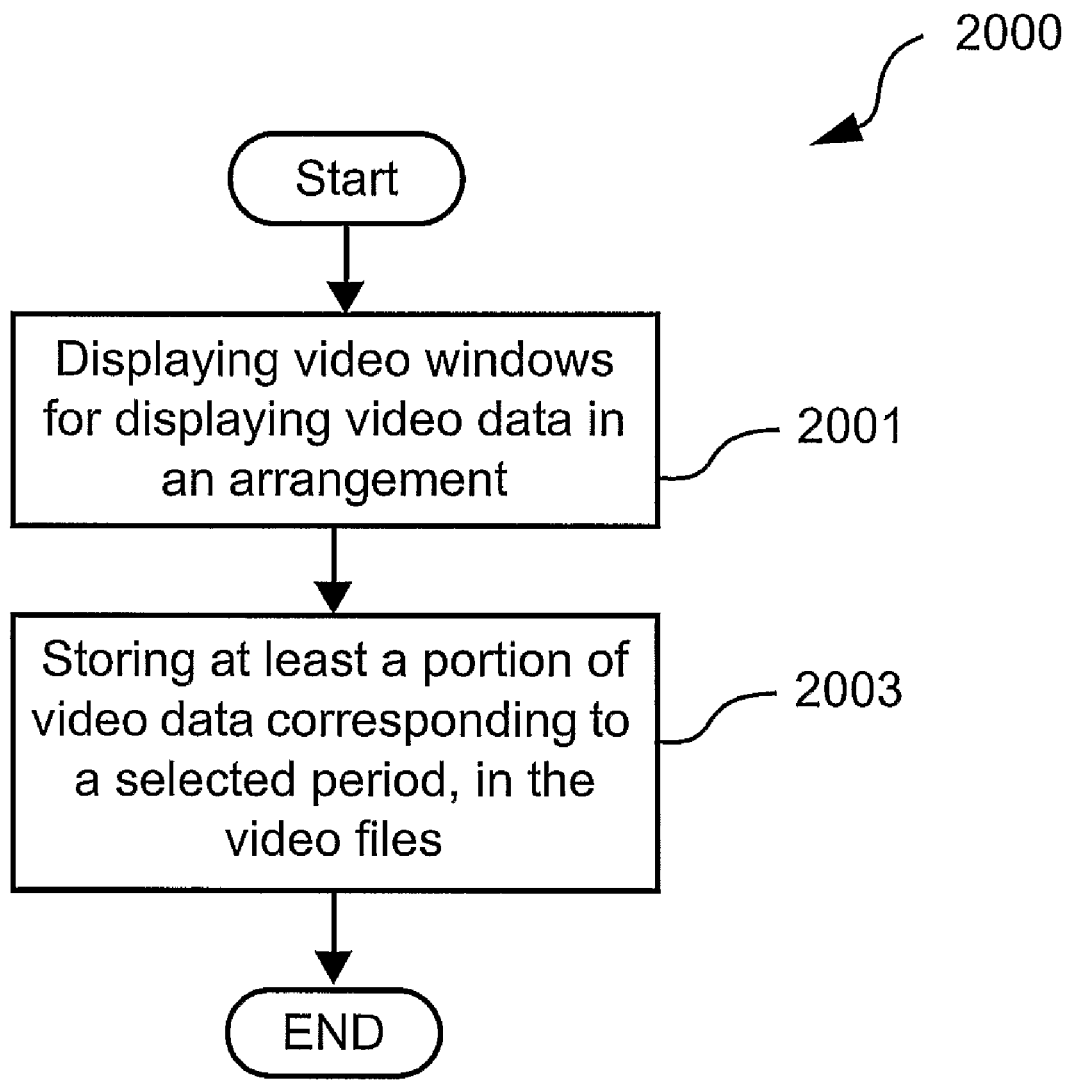
FIG. 20 is a flow diagram showing a method of storing video data in video files.

A method 2000 of storing video data in video files will now be described below with reference to FIG. 20. The method 700 may be implemented as software resident in the hard disk drive 210 of the viewer 200 and being controlled in its execution by the processor 205. The method 700 may be executed by the processor 205 in response to the Extract Video button 607 being pressed using the mouse 203, for example.

The method 2000 begins at step 2001, where the processor 205 displays video windows (e.g., 615) for displaying video data in an arrangement. For example, the video windows 615, 621, 623 and 625, as seen in FIG. 6, are displayed in an arrangement in the user interface 600. As described above, the video windows (e.g., 615) may be connected directly to receive live video data from the camera server 109-111 associated with the selected window 615. Alternatively, the video windows (e.g., 615) may display pre-recorded video data retrieved from the hard disk drive 210. Further, in response to clicking on any portion of the time line 601 using the mouse 203 in a conventional manner, the processor 205 retrieves pre-recorded video data from the hard disk drive 210 corresponding to the selected time for a currently selected video window (e.g., 615).

The method continues at the next step 2003, where at least a portion of the video data corresponding to a selected period, is stored in the video files. As described above, in the method 900, the processor 205 requests the storage server 205 to supply all video data captured by the camera 112-115 corresponding to the currently selected video window, within the time period defined in the dialog 600 (i.e., end time minus start time). The processor 205 may also request the storage server 300 to supply all event data that is associated with the camera 112-115 corresponding to a currently selected video window (e.g., 615). Further, the event data and video data requested at steps 905 and 907 of the method 900 is stored in the video files, in accordance with the method 1100.

At least one of the video files in which data is stored at step 2003 comprises data representing a user interface corresponding to the selected period. The video files maintain the arrangement of the video windows for subsequent display of frames of the portion of video data. As described above, the viewer 200 may utilise a user interface 600, as shown in FIG. 6, comprising a time line 601, a playhead 603, event icons (e.g., 605), time line buttons 607 and 617, a layout view 609 and a camera list 611. The layout view 609 may be used for viewing one or more streams of video data. Each stream of video data is associated with a particular video window (e.g., 615) which is given a set of co-ordinates within the layout view 609.

Further, as described above, a video file (e.g., the video file 1400) comprises a timeline 1401 covering a time period (e.g., the time period 613 highlighted in the example of FIG. 6). Continuing with the example video file 1400, the video file 1400 comprises two tracks represented by video windows 1403 and 1405 of the video file 1400. The video windows 1403 and 1405 correspond to the two video windows 615 and 621, respectively, which are selected in the example of FIG. 6. The video file 1400 also comprises event icons (e.g., 1408) representing each event (e.g., 605) present within the selected time period 613 of the example of FIG. 6. When the user hovers the pointer of the mouse 213 over one of the event icons of the video file 1400, an event description is displayed in the timeline 1401, and a preview of the video data captured at the time of the event is displayed in the video windows 1403 and 1405. The preview typically consists of one or more frames of video data covering the time period immediately before and after the event. The event icons are associated with the methods 1700, 1800 and 1900 described above.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive. For example, the viewing application software may create multiple video files from a presentation together. In this instance, the video file index may be stored in one video file, the background animation track including the timeline may be stored in a second video file, and the data for each of the video tracks may be stored in another video file.

In an alternative embodiment, the viewing application software may be configured to send a single message to the storage server 300 describing the cameras 112-115, layout and periods of video data to be extracted. In this instance, the storage server 300 creates the video file and transmits the video file to the viewing application software in response to a request. The viewing application software may then store the video file on the hard disk drive 210 or launch an appropriate media player to display one or more frames of video data stored in the video file.

In still another alternative embodiment, video data may be exported from all cameras 112-115 that have any recorded video data within the provided time frame. Alternatively, video data may be exported from all cameras 112-115 that are currently being viewed. This video data may be exported when no camera windows (e.g., 621) are selected in the viewing application software.

The cameras 112-115 may be grouped in zones which typically represent distinct geographical locations. For example, a multiple-floor building may have zones representing a basement, ground floor, $1^{st}$ floor and outside the building. In this instance, video data may be extracted from all cameras 112-115 in a particular zone. Such zones may be implemented using an additional input in the Extract Video dialog 800, as seen in FIG. 17. The Extract Video Dialog 800 may include a zone list 1701 allowing a user to select a zone.

The layout of video tracks in a video file may not be derived from the current positions of the corresponding video windows in the viewing software. Rather, the video windows may be sized and arranged in a grid where the size and arrangement of the grid is dependent on the number of video tracks present in the video file.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of storing different streams of video data in a video file, said method comprising:
   displaying one or more video windows each for displaying different respective ones of said streams of video data in an arrangement;
   selecting a period of said different streams of video data to be stored in said video file for display in said video windows when the video file is played back by a player;
   storing, for each said different stream of video data, a portion of the stream corresponding to said selected period in a corresponding video track of said video file; and
   storing, in said video file, along with each said video track in said video file, a relative spatial position of the video window corresponding to a respective one of the streams in the arrangement, wherein when said video file is played back by the player, the relative spatial positions stored in the video file are usable by the player to maintain the arrangement of video windows for displaying the different respective portions of said streams of video data.

2. A method according to claim 1, wherein each said different respective portion of said streams of video data and corresponding relative spatial positions are stored in a single video file together with said data representing said user interface.

3. A method according to claim 1, wherein said video windows are arranged together with a user interface enabling selection of said different respective portions of said streams of video data.

4. A method according to claim 1, further comprising retrieving said different respective portions of said streams of video data from storage prior to storing said video data in said video file.

5. A method according to claim 1, further comprising displaying a user interface comprising a user interactive time line.

6. A method according to claim 5, wherein said time line corresponds to said selected period.

7. An apparatus for storing different video data in a video file, comprising:
- means for displaying one or more video windows each for displaying different respective ones of said streams of video data in an arrangement;
- means for selecting a period of said different streams of video data to be stored in said video file for display in said video windows when the video file is played back by a player; and
- means for storing, for each said different stream of video data, a portion of the stream corresponding to said selected period in a corresponding video track of said video file, and
- means for storing, in said video file, along with each said video track in said video file, a relative spatial position of the video window corresponding to a respective one of the streams in the arrangement, wherein when said video file is played back by the player, the relative spatial positions stored in the video file are usable by the player to maintain the arrangement of video windows for displaying the different respective portions of said streams of video data.

8. A non-transitory computer readable storage medium on which is stored a computer executable program for storing different streams of video data in a video file, said program comprising:
- code for displaying one or more video windows each for displaying different respective ones of said streams of video data in an arrangement;
- code for selecting a period of said different streams of video data to be stored in said video file for display in said video windows when the video file is played back by a player;
- code for storing, for each said different stream of video data, a portion of the stream corresponding to said selected period in a corresponding video track of said video file; and
- storing, in said video file, along with each said video track in said video file, a relative spatial position of the video window corresponding to a respective one of the streams in the arrangement, wherein when said video file is played back by the player, the relative spatial positions stored in the video file are usable by the player to maintain the arrangement of video windows for displaying the different respective portions of said streams of video data.

9. A system for storing different streams of video data in a video file, said system comprising:
- a memory for storing data and a computer program;
- a processor coupled to said memory for executing said computer program, said computer program comprising instructions for:
- displaying one or more video windows each for displaying different respective ones of said streams of video data in an arrangement;
- selecting a period of said different streams of video data to be stored in said video file for display in said video windows when the video file is played back by a player;
- storing, for each said different stream of video data, a portion of the stream corresponding to said selected period in a corresponding video track of said video file; and
- storing, in said video file, along with each said video track in said video file, a relative spatial position of the video window corresponding to a respective one of the streams in the arrangement, wherein when said video file is played back by the player, the relative spatial positions stored in the video file are usable by the player to maintain the arrangement of video windows for displaying the different respective portions of said streams of video data.

* * * * *